United States Patent
Yamamura

[11] Patent Number: 6,023,766
[45] Date of Patent: Feb. 8, 2000

[54] SOFTWARE LICENSE CONTROL SYSTEM AND SOFTWARE LICENSE CONTROL EQUIPMENT

[75] Inventor: Kazuyuki Yamamura, Kawasaki, Japan

[73] Assignee: Fujitsu Limited, Kawasaki, Japan

[21] Appl. No.: 08/892,277

[22] Filed: Jul. 14, 1997

[30] Foreign Application Priority Data

Feb. 14, 1997 [JP] Japan ................................. 9-030916

[51] Int. Cl.[7] .............................. H04L 9/00; G06F 12/14
[52] U.S. Cl. .............................. 713/201; 713/200; 380/4; 380/23; 709/229
[58] Field of Search .............................. 395/187.01, 186, 395/200.55, 188.01, 200.59; 380/2, 4, 23, 25; 379/9, 364; 713/201, 200, 202; 709/225, 229

[56] References Cited

U.S. PATENT DOCUMENTS

| | | | |
|---|---|---|---|
| 4,937,863 | 6/1990 | Robert et al. | 380/4 |
| 5,138,712 | 8/1992 | Corbin | 395/186 |
| 5,204,897 | 4/1993 | Wyman | 380/4 |
| 5,390,297 | 2/1995 | Barber et al. | 713/201 |
| 5,438,508 | 8/1995 | Wyman | 380/4 |
| 5,579,222 | 11/1996 | Bains et al. | 380/4 |
| 5,684,951 | 11/1997 | Goldman et al. | 395/188.01 |
| 5,708,709 | 1/1998 | Rose | 380/4 |
| 5,717,604 | 2/1998 | Wiggins | 713/201 |
| 5,758,069 | 5/1998 | Olsen | 395/187.01 |
| 5,790,664 | 8/1998 | Coley et al. | 380/4 |

FOREIGN PATENT DOCUMENTS

| | | | |
|---|---|---|---|
| 6-223040 | 8/1994 | Japan | G06F 15/00 |
| 40-7141441 | 6/1995 | Japan | G06F 17/60 |

*Primary Examiner*—Robert W. Beausoliel, Jr.
*Assistant Examiner*—Christopher Revak
*Attorney, Agent, or Firm*—Staas & Halsey, LLP

[57] ABSTRACT

The invention provides a software license control system and a software license control equipment that control a license for a software (application program) used in a computer, that realizes to make the license control of the software efficient, to enhance reliability of the license, and to simplify control operations by users.

In order to achieve the object, the system according to the invention is provided with a software execution equipment that executes the software on which a license control software is added and a software license control equipment that controls the license for the software. The system is so designed as to interchange information relating to the license for the software between the software execution equipment and the software license control equipment by means of an electronic mail.

33 Claims, 21 Drawing Sheets

SOFTWARE LICENSE CONTROL SYSTEM AND SOFTWARE LICENSE CONTROL EQUIPMENT

BACKGROUND OF THE INVENTION

1. Field of the Invention

The present invention relates to a software license control system and the equipment for controlling a license for software, such as application program(s) used on a computer.

2. Description of the Related Art

In recent years, various techniques to control a license (official permission) for software (application programs used on a computer) have been developed, and license control has become complicated. Accordingly, an environment to run a license confirmation program and to operate the correspondent equipment is considered to be built up, whereby a user who bought a software can run the software.

As a system to control a license for software, the so-called network license system, node lock license system, and user license system are available. The operations of these license control systems will be briefly discussed below.

The network license system is applied to a system in which a plurality of computers (machines) are connected to be able to communicate with each other through a network. A license confirmation program is always on standby in one of the machines that is designed to function as a server. When a client starts software, the software accesses the license confirmation program in the server. The accessed license confirmation program checks the operational environment on the basis of information transmitted from the software of the client. If the operational environment is proper, the license confirmation program gives permission to operate to the client software.

As shown in FIG. 20, license confirmation (license collation) is accomplished between a server 100 and a client 200 in a network as follows.

On starting the server 100, the system is set so that the license confirmation program can be executed.

When the client 200 starts the software, a license confirmation request program in the software starts running. This license confirmation request program transmits a license confirmation request as well as a license information file that the client 200 holds to the server 100 via the network.

On the other hand, when the server 100 receives the confirmation request, a standby license confirmation program is started. This license confirmation program checks (collates) the operational environment by referring to the license information file transmitted from the client 200 and confirms the license. The server 100 transmits the confirmation result to the client 200 through the network. If the collation result (checking the operational environment, is proper, the server 100 sends permission to start the software to the client 200.

Thus, in the network license system, if the number of the users is within a number predefined in the license information file, a plurality of computers (clients 200 and server 100) can start the software at the same time.

The node lock license system controls a license by means of a host ID (host identifier). This system has no limits to the user's name or the number of the users, as long as the software is executed by the host. In other words, the software is executed only on the computers registered in advance. Therefore, in order that this system executes one piece of software on a plurality of computers at the same time, all the computers that use the software are must apply for and acquire the licenses.

The user license system controls a license by means of a user ID (user identifier). In this system, only the users registered in advance can execute the software.

The user license system employs the same aspect as that of the network license system as described above with reference to FIG. 20, however, as shown in FIG. 21, this system automatically registers the user who first executed the software and issues the user ID. In other words, the user who can use the software is registered on starting the software.

When the client 200 thereafter starts the software, the license confirmation requestprogram transmits a license confirmation request as well as the user ID to the server 100 through the network. The server 100 checks (collates) the user ID by the license confirmation program to confirm the license. When the server 100 finds that a user other than a registered user is executing the software by checking the user ID, it issues a warning.

Therefore, in the user license system, one user can start and execute the software on any computer in the network.

Therefore, in the user license system, if the number of the users is within a number predefined in the license information file, a plurality of computers (clients 200 and server 100) can start the software at the same time.

Conventionally, when a user applies to issue, modify, or update a license, the user requests the center for issuing a license password (license control center) to issue, modify, or update a license by electronic mail, a facsimile, and so on.

When the center for issuing a license password receives a request to issue a license, it confirms the application content from the user. If the application content is proper, the center for issuing a license password issues and transmits a license information file as well as a password to the user. If the user adopts, for example, a network file system (hereunder, abbreviated as NFS), when a license information file is transmitted back to the request to issue the license, the license information file is installed into a file server, and the license information file is shared by a plurality of computers in the NFS.

When the center for issuing a license password receives a request to modify or update a license, it confirms the content of the request from the user. If the content is proper, the center issues and transmits a new license information file to the user. If the user adopts, for example, the NFS, when a new license information file is transmitted back in response to the request to modify or update the license, the old license information file is deleted from the file server and the new license information file is installed into the file server, and the license information file is shared by a plurality of computers in the NFS.

The center for issuing a license password (license control center) controls, as to issuing, modifying, and updating, only the information when it receives therequest to issue, modify, andupdate from a user.

However, in the foregoing network license system, it is necessary for a user to start the license confirmation program, when the system to use the software starts the server, and to access the license confirmation program in the server and request confirmation of the license, when the client starts the software; and therefore, the user has to bear a heavy load. Further, since the license confirmation program is always in operation on the network by means of the client/server technique, the system is apt to be affected by the load on the network and the operational condition of the server, and in addition, the user has to control the license confirmation program.

In the foregoing node lock license system, the user has to make fewer settings to the system. However, when a plurality of computers use one piece of software at the same time, the user has to apply and acquire as many number of the licenses as the number of the computers, which is very troublesome.

In the foregoing user license system, the license control is performed by the same aspect as that of the network license system; and therefore, this system has completely the same problems as the aforementioned network license system. In addition, one user can start the software on any computer, and the license is likely to be used in fraudulence.

On the other hand, in all the conventional techniques, the license control other than the issue and modification of licenses is assigned to a user, and therefore, a user who bought the software is to control, for example, checking the log relating to the software. Consequently, the seller of the software cannot check the log. In other words, in the conventional license control system, the seller of the software can obtain the log when the license is issued, modified, and updated; however, since the license is collated only in the user's environment, the seller cannot control the log when the software is started.

Further, these techniques use a password file or the license information file to confirm the license. If the user rewrites the file to fraudulently use the software, the seller cannot confirm the fraud because the license control is left to the user.

SUMMARY OF THE INVENTION

The present invention has been made in view of the foregoing problems, and an object of the present invention is to provide a software license control system and software license control equipment that realize to enhanced efficiency in controlling a license for a software and reliability of the license and to simplify the control operation by a user.

In order to accomplish the foregoing object, the software license control system according to the present invention is provided with software execution equipment that executes software installed therein, and software license control equipment that controls the license for the software. The software license control system is characterized by interchanging information on the license for software between the software execution equipment and the software license control equipment by means of electronic mail.

The software license control equipment according to the invention controls a license for software that is executed by the software execution equipment, and is provided with an electronic mail receiving device for receiving electronic mail from the software execution equipment, a license issue device for issuing, modifying, or reissuing license when a content of electronic mail received by the electronic mail receiving device relates to a request to issue or modify the license, and an electronic mail transmitting device for transmitting a license information file as information on a license issued or reissued by the license issue device to the software execution equipment by electronic mail.

Thus, according to the software license control system and software license control equipment of the invention, the information on a license for software is interchanged between the software execution equipment and the software license control equipment by means of electronic mail, which reduces most of the processes of the license control conventionally conducted by a user, makes the license control for software efficient, enhances the reliability of the license, and simplifies the control operation by users.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

[A] Description of an Aspect of the Invention

Figure 1:
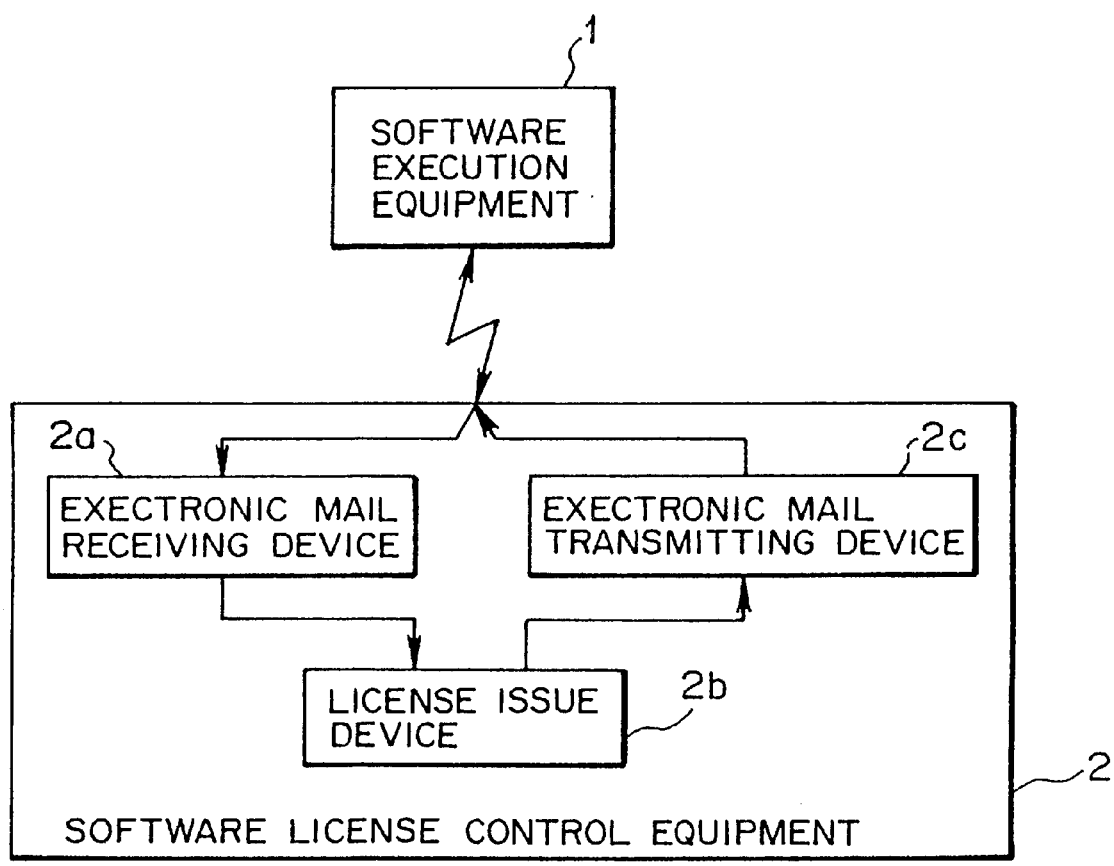
FIG. 1 is a block diagram showing an aspect of the invention.

FIG. 1 is a block diagram of the aspect of the invention. As shown in FIG. 1, the software license control system in the invention comprises software execution equipment 1 for executing software installed therein and software license control equipment 2 for controlling a license for the software, and interchanges information on the license for the software between the software execution equipment 1 and the software license control equipment 2 by means of electronic mail.

The software license control equipment 2 is provided with an electronic mail receiving device 2a for receiving electronic mail from the software execution equipment 1, a license issue device 2b for issuing, modifying, or reissuing a license when the contents of electronic mail received by the electronic mail receiving device 2a relates to a request to issue or modify a license, and an electronic mail transmitting device 2c for transmitting a license information file as information on the license issued and/or reissued by the license issue device 2b to the software execution equipment 1 by means of electronic mail.

Software executed in the software execution equipment 1 has function to request a license collation that transmits, on starting the software, a license collation request as well as a license information file to the software license control equipment 2 by means of electronic mail, and when electronic mail received by the electronic mail receiving device 2a contains a license collation request, the software license control equipment 2 may comprise a license collation device for collating a license on the basis of the license information file transmitted with the license collation request and the electronic mail transmitting device 2c may transmit a collation result by the license collation device to the software execution equipment 1 by means of electronic mail.

Further, the software license control equipment 2 may comprise a license update device that automatically performs a periodical update of a license issued and/or reissued by the license issue device 2b before the expiration date, and the electronic mail transmitting device 2c may transmit update information by the license update device to the software execution equipment 1 having the license by means of electronic mail.

Further, the software license control equipment 2 may comprise a log control device that records and stores information on a request to issue or modify a license received by the electronic mail receiving device 2a, information on a license issued and/or reissued by the license issue device 2b, a collation result by the license collation device, and update information by the license update device, as log data.

In this case, when modifying or reissuing a license, the license issue device 2b may refer to the log data stored in the log control device and may judge the propriety or impropriety of a modification on the basis of the log data relating to the license. When the license issue device 2b judges the modification content to be improper, the electronic mail transmitting device 2c transmits warning information to the software execution equipment 1 having the license by electronic mail.

Further, when collating a license, the license collation device may refer to the log data stored in the log control device and may collate on the basis of the log data relating to the license. When the collation result by the license collation device is improper, the electronic mail transmitting device 2c transmits a warning information to the software execution equipment 1 having the license by electronic mail.

Further, when executing a periodical update, the license update device may refer to the log data stored in the log control device and may judge whether to approve the update on the basis of the log data relating to the license. When the license update device judges not to approve the update, the license update device stops the periodical update and the electronic mail transmitting device 2c transmits a warning to the software execution equipment 1 having the license by means of electronic mail.

On the other hand, the software executed in the software execution equipment 1 has a log data transmission function that transmits, on starting the software, the log data of the software to the software license control equipment 2 electronic mail, and when electronic mail received by the electronic mail receiving device 2a contains the log data of the software, the log control device may record and store the log data of the software and the log control device may transmit periodically or occasionally the information stored in the log control device to the developer or seller of the software.

Further, when the software executed in the software execution equipment 1 checks a license environment in the software execution equipment 1 on the basis of the license information file of the software and judges the license environment to be proper, the software may comprise a check function to set the software into a temporary start state and a standby function that awaits a collation result from the software license control equipment 2 and sets the software from the temporary start state into a normal start state if the collation result is proper, on the other hand, forcibly ends the execution of the software if the collation result is improper.

As described hereinabove, according to the software license control system and the software license control equipment relating to the invention, the following effects and advantages can be achieved.

(1) The software execution equipment 1 and the software license control equipment 2 interchange information on a license of software by electronic mail, and most of the license control processes conventionally done by users can be reduced, thus making the license control for software efficient, enhancing reliability of the license, and simplifying the control operation by a user.

(2) The license control only needs to operate a license control program on starting the software, and therefore, the license control does not impose an extra load on a user's system (software execution equipment 1), it can minimize settings to the user's system, and it greatly contributes to simplifying the license control operation performed by a user.

(3) Since the software requests to confirm (collate) the propriety of a license to the software license control equipment 2 by electronic mail, reliability of the license can be enhanced greatly.

(4) The issue, modification, and update of a license are processed by means of an electronic mail, the processed results are recorded and stored in the log control device, and the contents stored in the log control device are used in judging whether or not the issue, modification, and update are proper; and therefore, a still more strict license control becomes possible, and reliability of the license can greatly be enhanced.

(5) Various processed results relating to log data of the software and the licenses are stored in the log control device, and the developer of the software can refer to the contents, which can be reflected on the development and/or support of the software; and therefore, this system can significantly contribute to improving efficiency in developing the software, enhancing quality and reliability of the software, and improving efficiency in examining a countermeasure against faults of the software.

[B] Description of One Embodiment of the Invention

One embodiment of the invention will hereunder be described with reference to the accompanying drawings.

Figure 2:
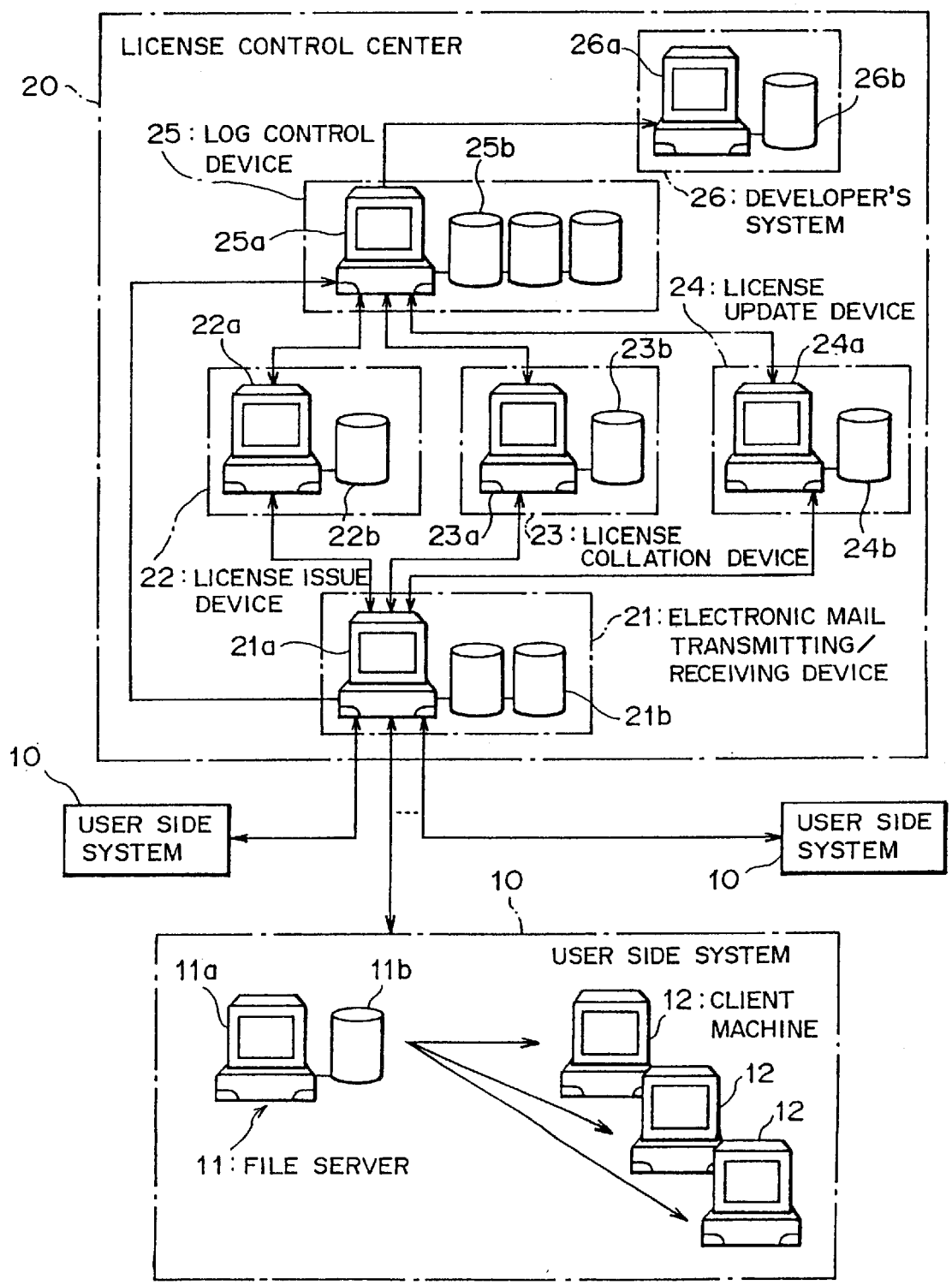
FIG. 2 is a block diagram showing a construction of a software license control system and a license control center as one embodiment of the invention.

FIG. 2 is a block diagram showing a construction of a software license control system and a license control center as one embodiment of the invention. As shown in FIG. 2, the software license control system of the embodiment is formed by a plurality of user side systems (software execution equipment) 10 that execute software (application program) installed therein and a license control center (software license control equipment) 20 that controls a license for the software. And, the software license control system interchanges information on the license for the software between the software execution equipment 10 and the software license control equipment 20 by means of electronic mail.

The user side system 10 adopts, for example, the NFS (Network File System), and comprises a file server 11 and a plurality of client machines 12. The file server 11 includes a file server machine 11a and a file server data base 11b. In the file server data base 11b is stored a license information file issued by a license issue device 22 as well as a license log file and an environment file as described later.

Figure 3:
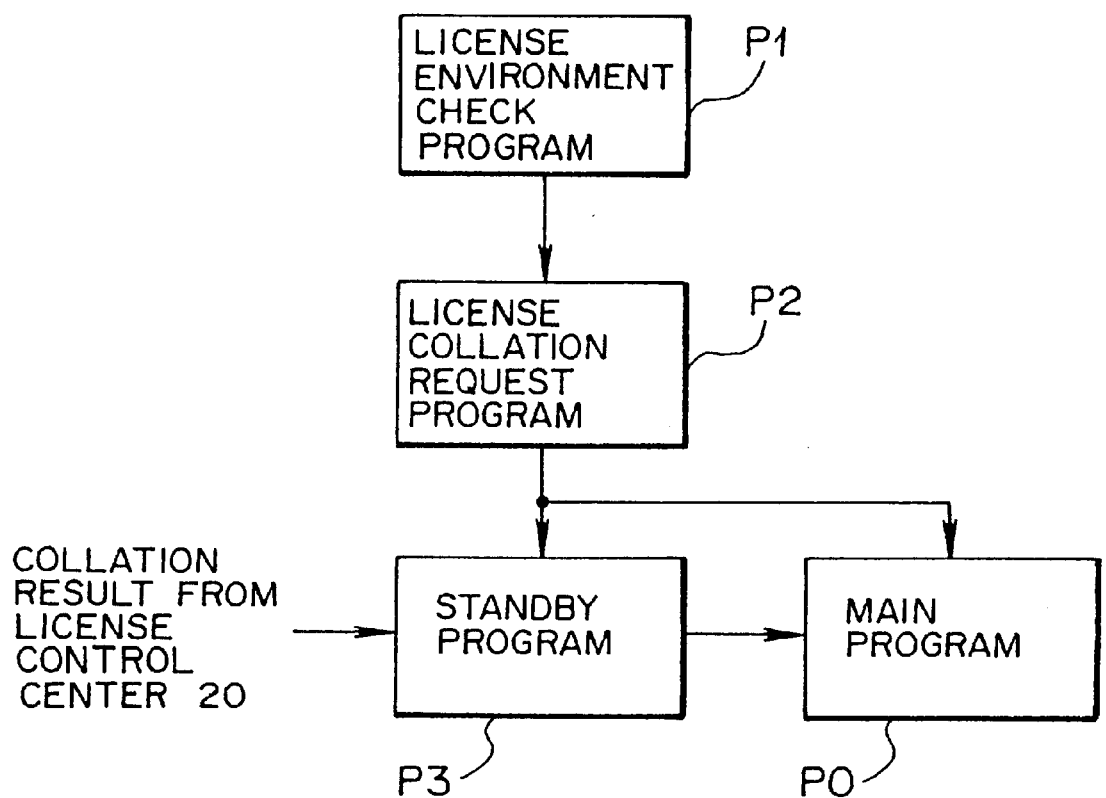
FIG. 3 is a block diagram showing a functional configuration of software in the embodiment illustrated in FIG. 2.

The software executed in the user side system 10 has a functional constitution as shown in FIG. 3 for an example. Namely, the software as an object controlled by the license control center 20 has a main program P0 for executing a primary function, and in addition has a license environment check program P1 that is first executed on starting, a license collation request program P2, and standby program P3, which are added in advance.

The license environment check program (check function) P1 checks a license environment in the software execution equipment 10, and if the program P1 judges the license environment to be proper, the program P1 sets the software into a temporary start state. The program P1 compares a license condition of the license information file in the file server 11 with an actual software execution environment (operational environment in the user side system 10), and if the two coincide, the program P1 starts the license collation request program P2.

The license collation request program (license collation request function) P2 transmits, on starting the software, a license collation request to the license control center 20 by electronic mail. When an application to issue the license is complete according to a procedure described later in FIG. 4, the license of the software is registered, and the software is started, the program P2 retrieves a mail address for the license control center 20 to control the program P2 from the license information file in the file server 11. The program P2 automatically transmits, using the mail address, the license information file (license condition, operational condition) and the log file (log data, user data) relating to the software, also stored in the file server 11, to the license control center 20 with the license collation request by electronic mail.

Thus, the license collation request program P2 executes a log data transmission function that transmits a log file of the software to the license control center 20 on starting the software by electronic mail. If it is not possible to transmit electronic mail, the program P2 transmits a warning to forcibly end the execution of the software. On the other hand, if it is possible to transmit electronic mail, the program P2 sets the main program P0 of the software into a temporary start state and starts the standby program P3.

The standby program (standby function) P3 waits for a collation result transmitted from the license control center 20 by electronic mail and judges the collation result when it receives the collation result transmitted from the center 20. If the collation result is proper, the standby program P3 ends and only the main program P0 of the software continues operation, namely, the standby program P3 sets the main program P0 from the temporary start state into the normal start state. On the other hand, if the collation result is improper, the standby program P3 forcibly ends the execution of the software (main program P0).

The operation of these programs P1 through P3 will be detailed with reference to FIG. 5.

Figure 20:
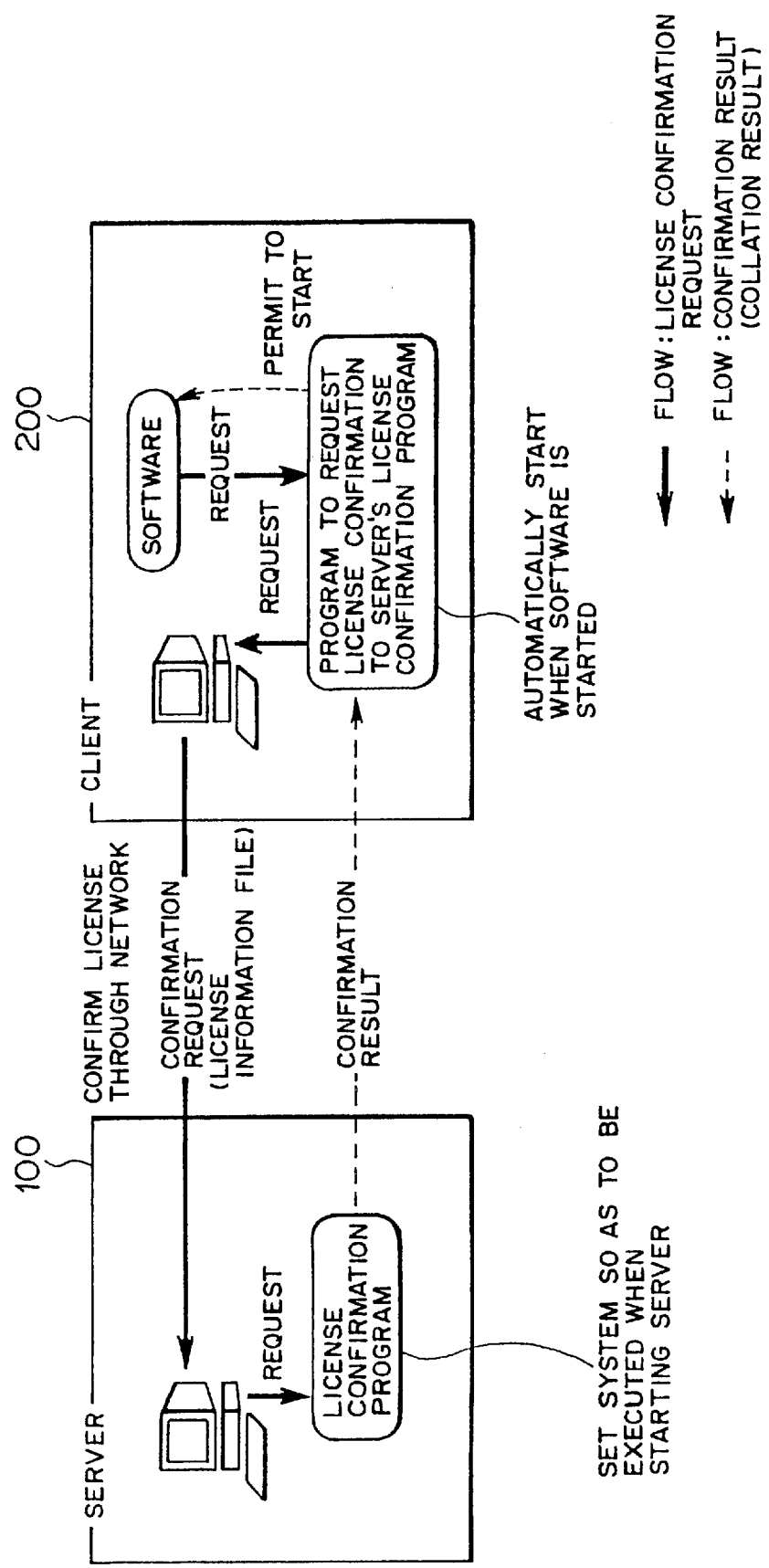
FIG. 20 is a chart for explaining license collation by the network license system.
Figure 21:
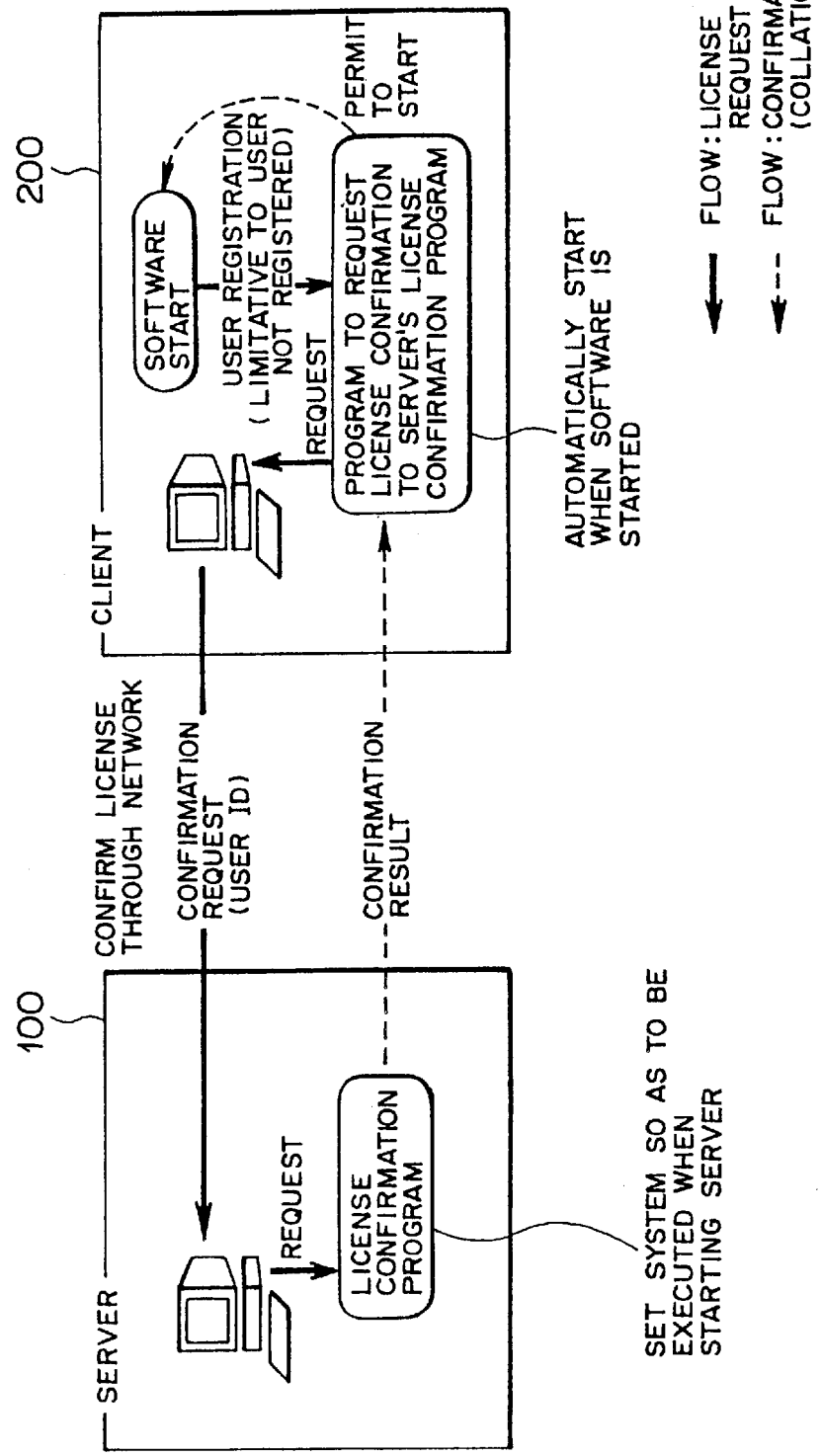
FIG. 21 is a chart for explaining license collation by the user license system.

Means whereby the software confirms a license condition, namely, the check operation by the license environment check program P1 employs the same aspect of the NFS as the foregoing example in FIG. 20. In the user system 10, a license information file transmitted from the license control center 20 is installed in a location (directory) that the software assigns in the data base 11b of the file server 11, and the license information file is shared by a plurality of client machines 12 through the NFS. The software (license environment check program P1) executed on the machines 12 or the server 11 refers to the license information file stored in the directory in the data base 11b of the file server 11 and confirms the license condition.

Further, as a means to transmit the log file from the user system 10 to the license control center 20, the software uses electronic mail when a user starts the software purchased. The log file transmitted to the center 20 by electronic mail is stored in a log control device 25 (described later), and the log file is utilized for preventing fraudulent use of a license and for quality control of the software.

On the other hand, the license control center 20 of the embodiment controls the license information such as issue, deletion, update, modification, and confirmation of licenses, and in order to raise the transmission and reception efficiency of electronic mail, the license control centers 20 are dispersed in each area.

The license control center 20 comprises, as shown in FIG. 2, an electronic mail transmitting/receiving device 21, license issue device 22, license collation device 23, license update device 24, log control device 25, and developer's system 26.

The electronic mail transmitting receiving device (electronic mail receiving device, electronic mail transmitting device) 21 comprises a machine 21a for transmitting and receiving electronic mails and a data base 21b. The electronic mail transmitting/receiving device 21 executes a function as an electronic mail receiving device that receives electronic mail from the user system 10, and a function as the electronic mail transmitting device that transmits results processed by the license issue device 22, license collation device 23, and license update device 24 to the user system 10 by electronic mail. The electronic mail transmitting/receiving device 21, upon receiving electronic mail, transfers the mail to one of the license issue device 22, license collation device 23, and license update device 24 according to the content of the mail, and transfers the same to the log control device 25 to store the content.

The license issue device (license issue system) 22 comprises a license issue machine 22a and data base 22b. When the content of electronic mail received by the electronic mail transmitting receiving device 21 relates to a request to issue or modify a license, the license issue device 22 issues, modifies, or reissues a license information file. The license information file issued and/or reissued by the license issue device 22 is enciphered, and the enciphered license information file is transmitted from the electronic mail transmitting/receiving device 21 to the user system 10 by electronic mail.

The license issue device 22 refers to a log file of the software to be modified that is stored in the log control device 25 when modifying or reissuing a license, and judges the propriety or of the modification on the basis of the log file relating to the license. When the license issue device 22 judges that the modification is improper, the electronic mail transmitting/receiving device 21 transmits a warning to the user system 10 having the license by electronic mail. The operation of the license issue device 22 will be detailed later with reference to FIG. 7 and FIG. 8.

The license collation device (license collation system) 23 comprises a license collation machine 23a and a data base 23b. When electronic mail received by the electronic mail transmitting receiving device 21 contains a license collation request, the license collation device 23 compares a license information file transmitted with the license collation request with a copy of the license information file stored in the log control device 25 which was issued when the license was applied, and thus, collates the license. The collation result is transmitted to the user system 10 that is the collation requester from the electronic mail transmitting/receiving device 21 by electronic mail. If the collation result by the license collation device 23 is improper, the electronic mail transmitting/receiving device 21 transmits a warning to the user system 10 taht is the collation requester by electronic mail. The operation of the license collation device 23 will be detailed later with reference to FIG. 9.

The license update device (license update system) 24 comprises a license update machine 24a and a data base 24b, and updates a license periodically automatically before the expiration date of the license issued and/or reissued by the license issue device 22. The update information (a new license information file when properly updated) by the license update device 24 is enciphered, and the enciphered update information is transmitted from the electronic mail transmitting/receiving device 21 to the user system 10 by electronic mail.

The license update device 24 refers to a log file of the software to be updated that is stored in the log control device 25 when updating a license periodically, and judges whether to give permission to update on the basis of the log file relating to the license. When the license update device 24 judges to refuse permission to update, the license update device 24 stops the periodical update and the electronic mail transmitting/receiving device 21 transmits a warning to the user system 10 having the license by electronic mail. The operation of the license update device 24 will be detailed later with reference to FIG. 10.

The log control device (license control system) 25 comprises a license control machine 25a and a data base 25b, and records and stores contests of a request to issue or modify a license received by the electronic mail transmitting/receiving device 21, a license information file issued or reissued by the license issue device 22, a collation result produced by the license collation device 23, and update information produced by the license update device 24, as a log data.

If electronic mail received by the electronic mail transmitting/receiving device 21 contains a log file of the software, the log control device 25 records and stores the log file transferred from the electronic mail transmitting/receiving device 21. Further, the log control device 25 also has a function to periodically or occasionally transfer the contents stored in the log control device 25 (data base 25b) to the developer's system (or seller's system) 26 of the software.

The developer's system 26 comprises a developer's machine 26a and a developer's data base 26b, and it is intended to develop the software as an object for the license control. A part of the log data of the software is fed back from the log control device 25 to the developer's system 26, which is reflected on a development or support of the software, and utilized in controlling quality of the software or in examining countermeasures against faults of the software.

Next, the operation of the software license control system according to the embodiment thus constructed will be described with reference to FIG. 4 through FIG. 19.

First, the operation of the user system 10 will be detailed with reference to FIG. 4 and FIG. 5.

Figure 4:
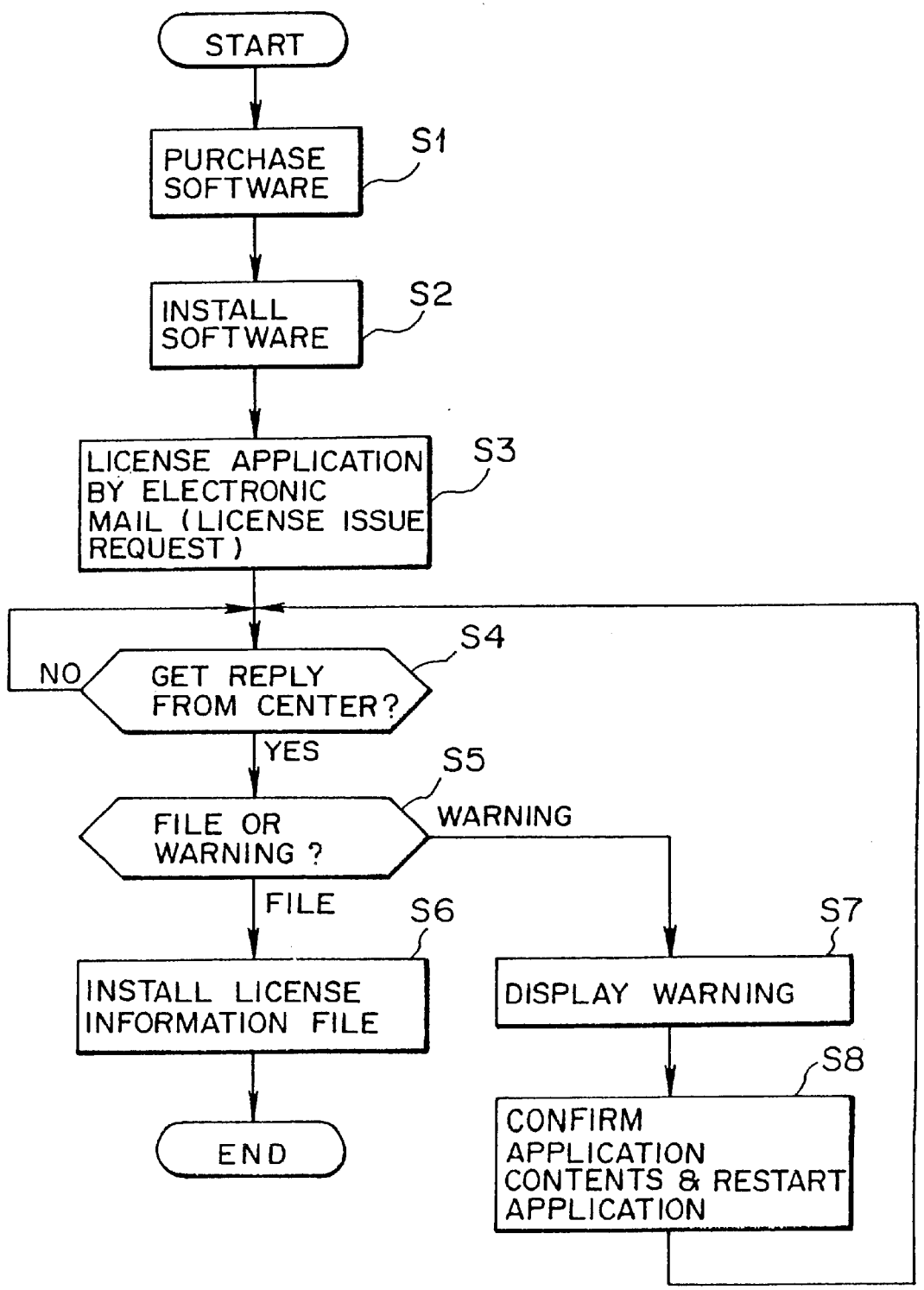
FIG. 4 is a flow chart for explaining an operation in applying for an issue of a license in a user system of the embodiment in FIG. 2.

FIG. 4 is a flow chart (step S1~S8) for explaining the operation of an application to issue a license in the user system 10. As shown in FIG. 4, when user buys a software (step S1), the user installs the software (step S2).

Then, the user applies a license for the software (request to issue the license) to the license control center 20 by electronic mail (step S3). In applying the license, the user may transmits electronic mail by the user's operation, or the user may use a program built in the software to automatically apply the license on starting the software.

Thereafter, the system waits for a reply to the license application from the licence control center 20(step S4), and if it receives the reply (YES judgment), the step S5 judges whether the reply contains either a license information file or a warning. If the reply contains the license information file, the license information file is installed in the file server 11 (step S6). On the other hand, if the reply contains a warning, the step S7 gives a warning display to the user who applied the license. The user confirms the contents of the application and restarts the application (return to step S4 from step S8).

Figure 5:
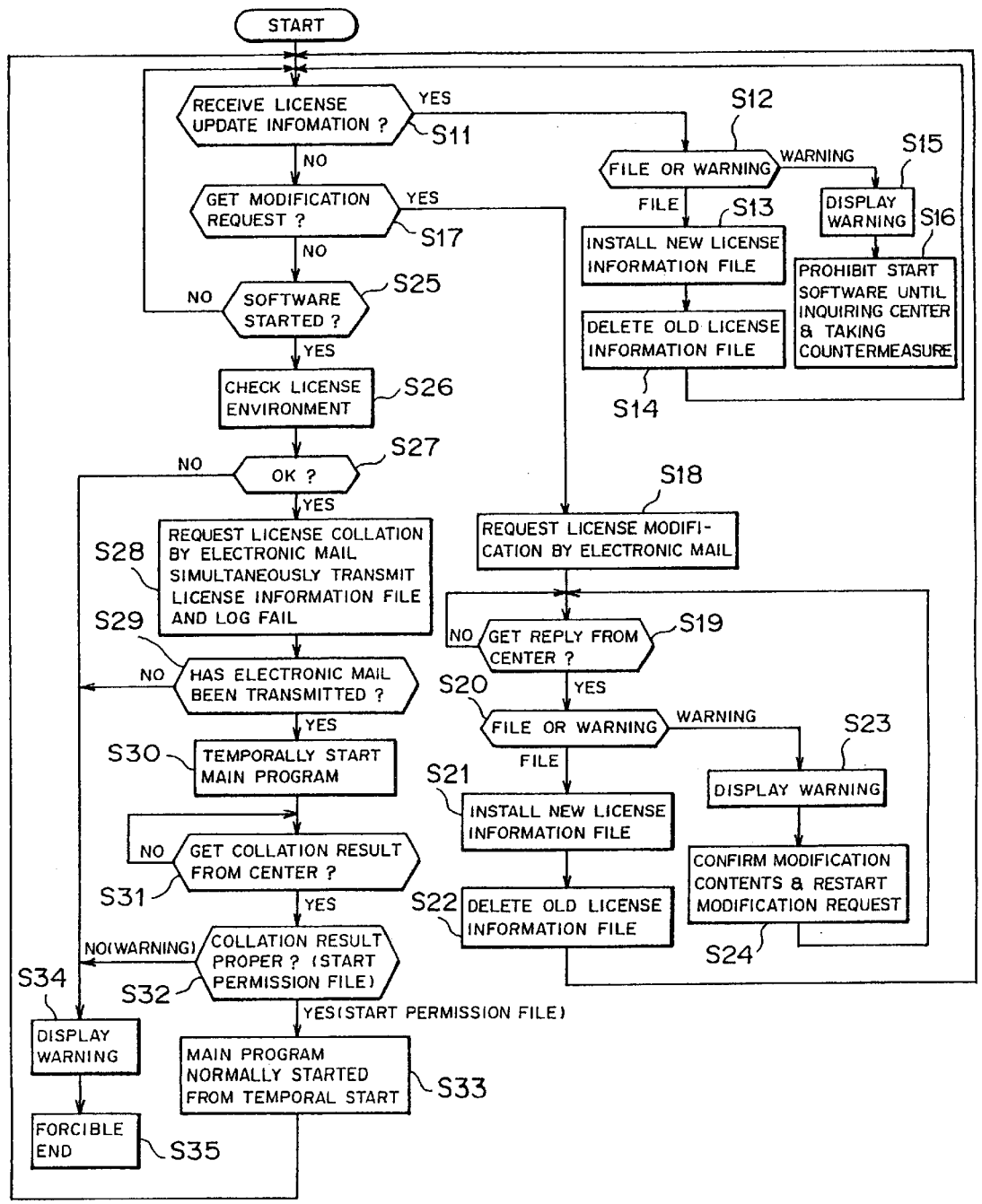
FIG. 5 is a flow chart for explaining a license control operation after a license has been issued in a user system of the embodiment in FIG. 2.

As described above, the user system 10 controls the license in accordance with the flow chart (step S11~step S35) shown in FIG. 5, as to the software with the license information file issued by the license control center 20.

In other words, the user system 10 judges, for each control period, whether license update information is received from the license control center 20 (step S11), whether a license modification is requested by a user (step S17), and whether the software is started (step S25).

Where the license update information is received from the license control center 20 (YES judgment at step S11), the user system 10 judges whether the license update information contains either a new license file or a warning information (step S12). If it contains a new license information file, the new license information file is installed in the file 11 (step S13), and the old license information file is deleted (step S14). On the other hand, if it contains a warning, the user is given a warning display (step S15), and the user is prohibited from starting the software until the user inquires of the license control center 20 and takes necessary measures (step S16).

Where the license modification is requested by a user (YES judgment at step S17), the user system 10 requests to modify the license for the software to the license control center 20 by electronic mail (step S18). Thereafter, the system waits for a reply to the license modification request from the license control center 20 (step S19), and if it receives an affirmative reply (YES judgment), the step S20 judges whether the reply contains either a new license information file or a warning. If the reply contains a new license information file, the new license information file is installed in the file server 11 (step S21) and the old license information file is deleted (step S22). On the other hand, if the reply contains a warning, the step S23 gives a warning display to the user who requested the license modification. The user confirms the contents of the modification request and restarts the modification request (return to step S19 from step S24).

Where the software is started (YES judgment at step S25), the license environment check program P1 compares a license condition of the license information file with an actual execution environment of the software (operational environment in the user system 10) (step S26). If the foregoing two coincide (YES judgment at step S27), step S28 to starts the license collation request program P2. If the license condition and the execution environment do not coincide (NO judgment at step S27), the user system 10 gives a warning display to the user (step S34), and thereafter, forcibly ends the execution of the software (step S35).

When the license collation request program P2 is started, the program P2 retrieves a mail address for the license control center 20 to control the program P2 from the license information file. The program P2 automatically transmits, using the mail address, the license information file and the log file relating to the software to the license control center 20 with the license collation request by means of electronic mail (step S28).

Where the step S28 could not transmit electronic mail (NO judgment at step S29), the system gives a warning display to the user (step S34), and then, forcibly ends the execution of the software (step S35).

Where the step S28 could transmit electronic mail (YES judgment at step S29), the system temporally starts the main program P0 of the software (step S30).

After temporally starting the main program P0, the system starts the standby program P3 and waits for a collation result transmitted from the license control center 20 by electronic mail (step S31). When the collation result is transmitted from the center 20 (YES judgment), the system judges the collation result, and if the collation result is proper (YES judgment at step S32), the system ends the standby program P3 to continue only the main program P0 of the software, that is, the system sets the main program P0 from the temporary start state into the normal start state (step S33). On the other hand, if the collation result is improper (NO judgment at step S32), the system gives a warning display to the user (step S34), and thereafter, forcibly ends the execution of the software (main program P0) (step S35).

Next, the operation of the license control center 20 will be detailed with reference to FIG. 6 through FIG. 10.

Figure 6:
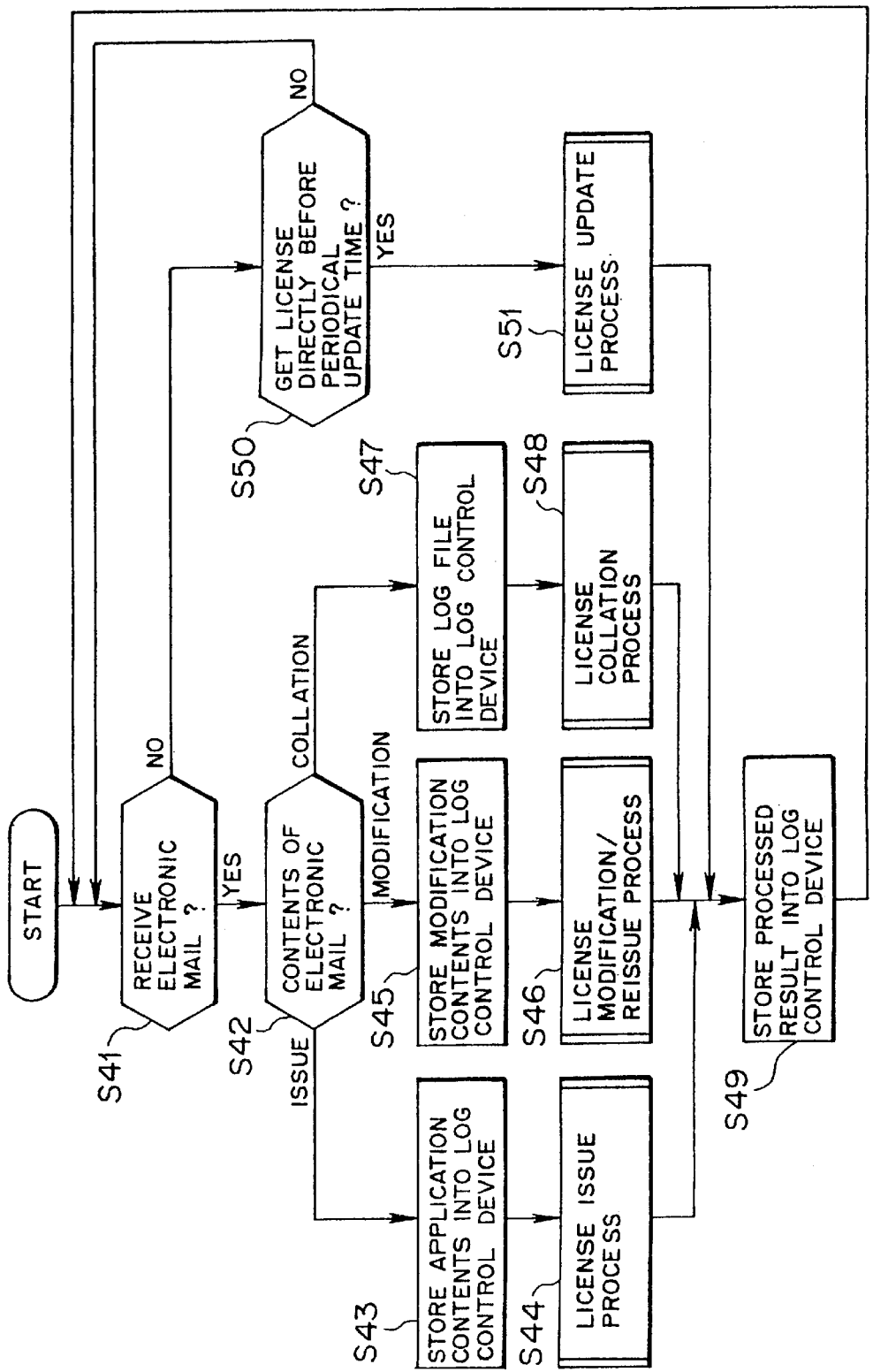
FIG. 6 is a flow chart for explaining an operation in a license control center of the embodiment.

FIG. 6 is a flow chart (step S41~S51) for explaining the operation of the license control center 20. As shown in FIG. 6, the license control center 20 always judges whether the electronic mail device 21 receives electronic mail from the user system 10 (step S41), and the center 20 judges whether the log control device 25 has a license that approaches a periodical update time, namely, an expiration date of the license (step S50).

Where the electronic mail transmitting/receiving device 21 receives electronic mail from the user system 10 (YES judgment at step S41), the electronic mail transmitting/receiving device 21 judges the content of the electronic mail (step S42).

If the content of electronic mail is a request to issue a license, the electronic mail transmitting/receiving device 21 transfers the application content to the log control device 25 and the content is stored in the log control device 25 (step S43). At the same time the electronic mail transmitting/receiving device 21 starts the license issue device 22 and transfers the application content to the license issue device 22, and the step moves to a license issue process (step S44) described later in FIG. 7.

If the content of electronic mail is a request to modify a license, the electronic mail transmitting/receiving device 21 transfers a modification content to the log control device 25 and the content is stored in the log control device 25 (step S45). At the same time the electronic mail trasnsmitting/receiving device 21 starts the license issue device 22 and transfers the modification content to the license issue device 22, and processing continues with a license modification and/or reissue process (step S46) described later in FIG. 8.

Further, if the content of electronic mail is a request to collate a license, the electronic mail trasnsmitting/receiving device 21 transfers the log file transmitted with the collation request to the log control device 25 and the log file is stored in the log control device 25 (step S47). At the same time the electronic mail trasnsmitting/receiving device 21 starts the license collation device 23 and transfers the license information file transmitted with the collation request to the license collation device 23, and processing continues with to a license collation process (step S48) described later in FIG. 9.

On the other hand, where the system judges from the log control device 25 that a license approaching the periodical update time is present (YES judgment at step S50), the log control device 25 starts the license update device 24 and transfers the log data relating to the license approaching the periodical update time to the license update device 24, and the step goes to a license update process (step S51) described later in FIG. 10.

When the license issue process (step S44), license modification and/or reissue process (step S46), license collation process (step S48), and license update process (step S51) end, the results of the processes are transferred to the log control device 25 and stored in the log control device 25 (step S49).

Next, the license issue process (step S44), license modification and/or reissue process (step S46), license collation process (step S48), and license update process (step S51) will be detailed with reference to FIG. 7 through FIG. 10.

Figure 7:
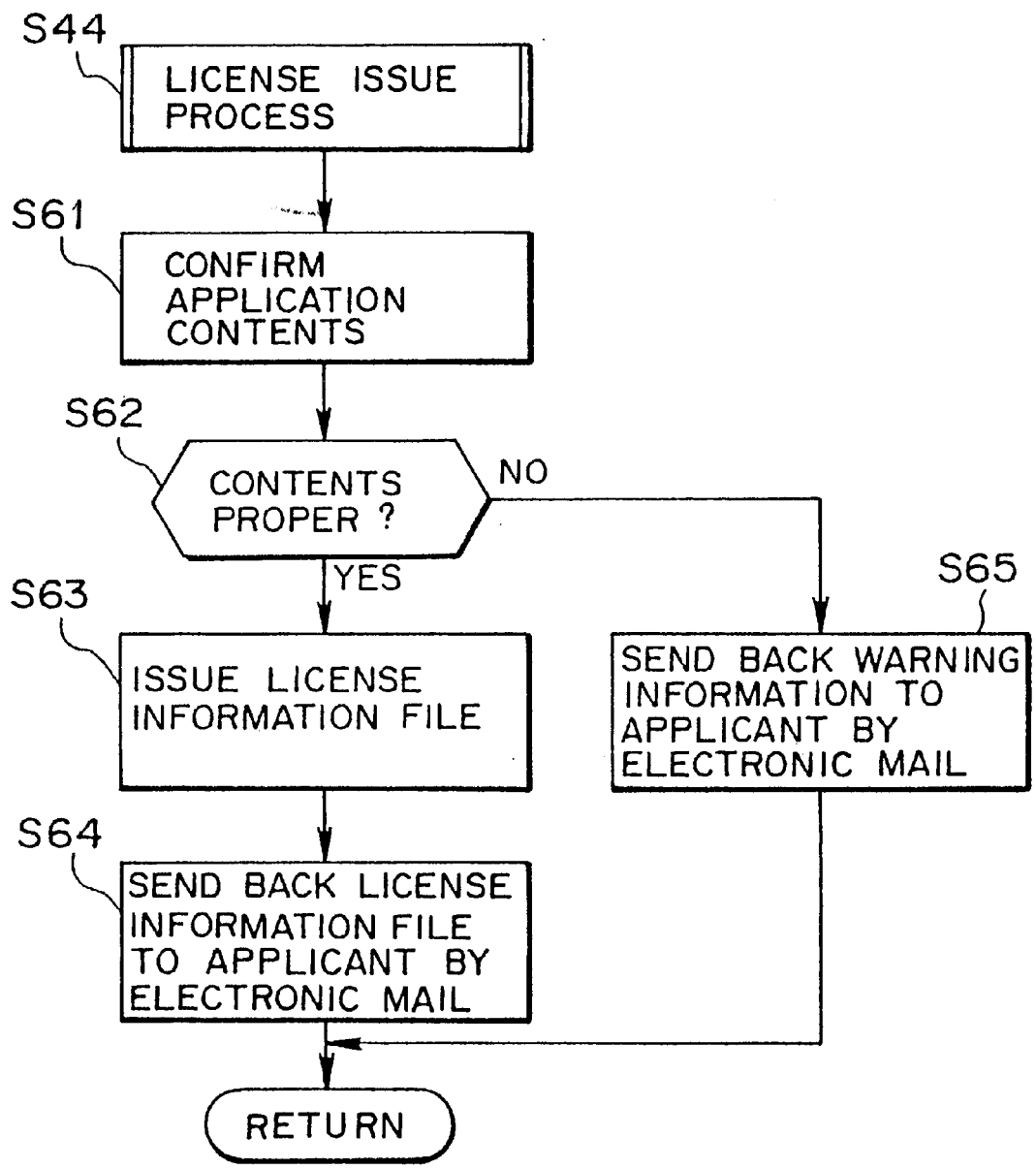
FIG. 7 is a flow chart for explaining a license issue process in a license control center of the embodiment in FIG. 2.

The license issue process (step S44) executes processes according to the flow chart (stepS61~S65) shown in FIG. 7. First, theprocess confirms application content (step S61) and judges whether the application content is proper (step S62). If it is proper, the license issue device 22 issues a license information file (step S63) and transmits the license information file back to the user system 10 of the applicant from the electronic mail trasnsmitting/receiving device 21 by electronic mail (step S64). If it is improper, on the other hand, the license issue device 22 transmits a warning to the user system 10 of the applicant from the electronic mail trasnsmitting/receiving device 21 by electronic mail (step S65).

Figure 8:
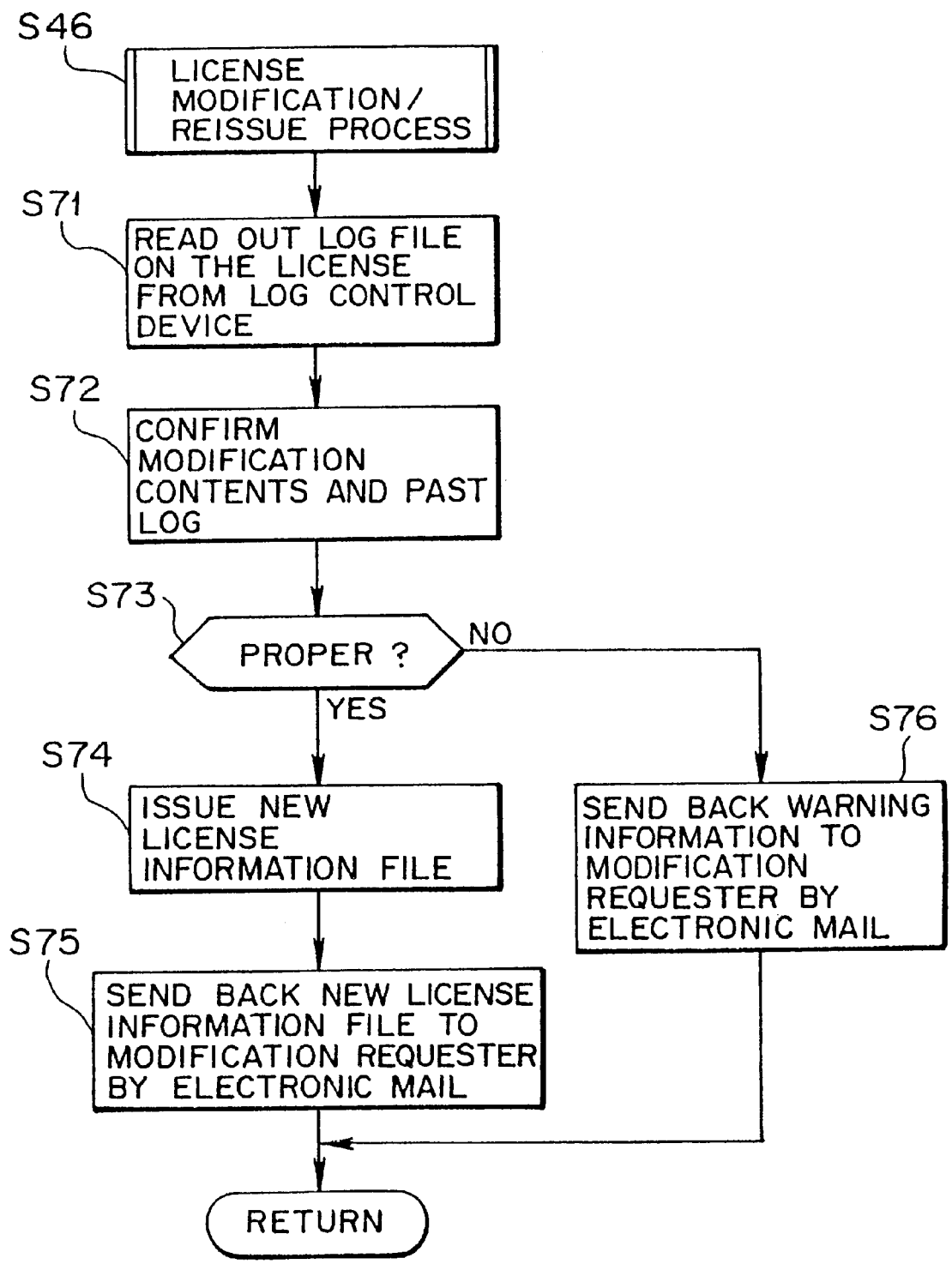
FIG. 8 is a flow chart for explaining a license modification/reissue process in the license control center of the embodiment in FIG. 2.

The license modification and/or reissue process (step S46) executes processes according to the flow chart (step S71~S76) shown in FIG. 8. First, the process reads out the log file relating to the license for which a modification is requested from the log control device 25 (step S71), confirms the present modification content, previous application content, and past log while referring to the modification content and the log file (step S72), and judges whether the present modification content is proper (step S73). If it is proper, the license issue device 22 issues a new license information file (step S74) and transmits the new license information file back to the user side system 10 of the modification requester from the electronic mail trasnsmitting/receiving device 21 by electronic mail (step S75). If it is improper, on the other hand, the license issue device 22 transmits a warning to the user system 10 of the modification requester from the electronic mail trasnsmitting/receiving device 21 by electronic mail (step S76).

Figure 9:
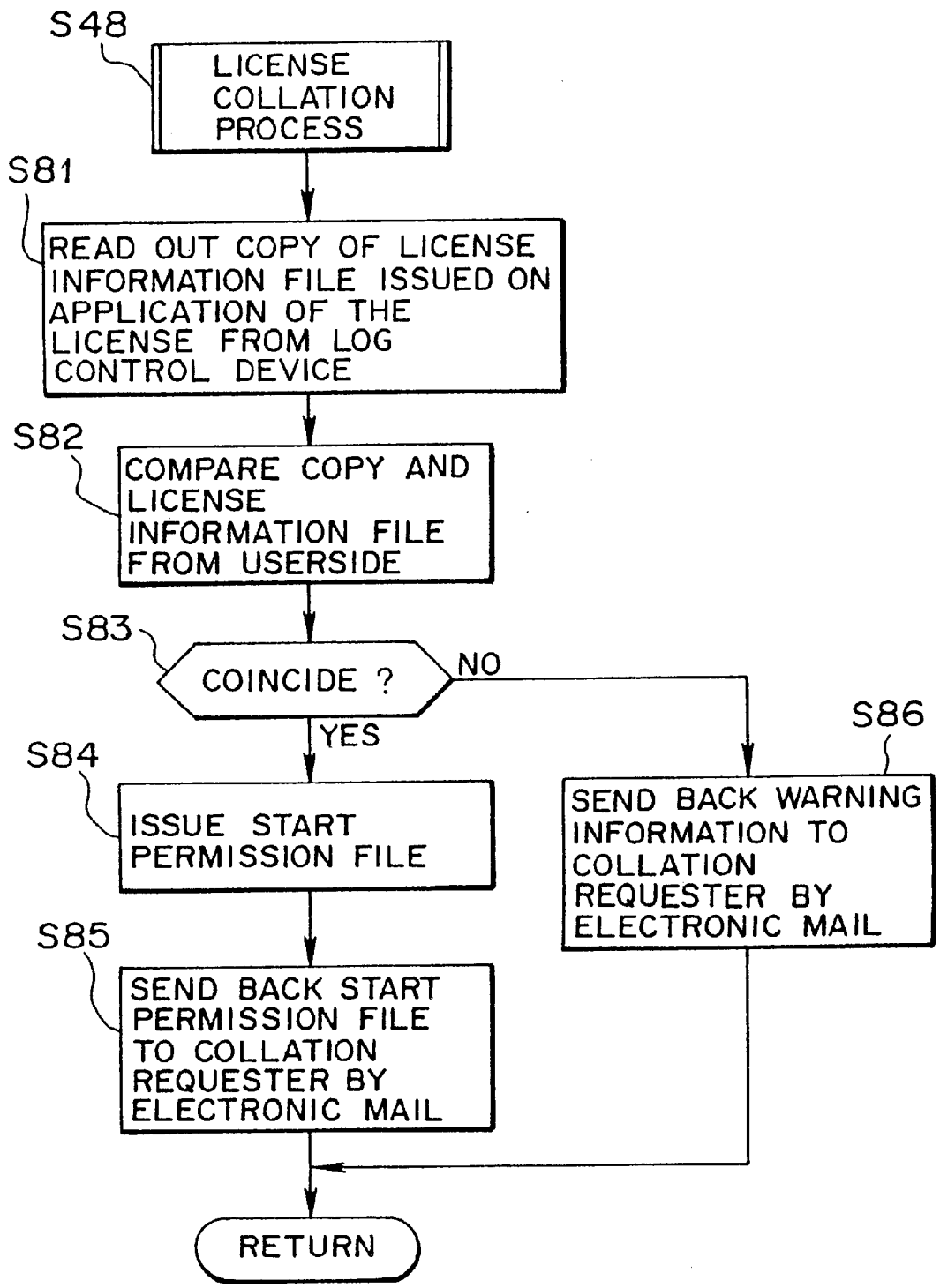
FIG. 9 is a flow chart for explaining a license collation process in the license control center of the embodiment in FIG. 2.

The license collation process (step S48) executes processes according to the flow chart (step S81~S86) shown in FIG. 9. First, the process reads out a copy of the license information file from the log control device 25, issued on applying the license for which a collation is requested (step S81), compares the copy with the license information file from the user system 10 (step S82), and judges whether these two contents coincide (step S83). If the two coincide, the license collation device 23 issues a start permission file (step S84) and transmits the start permission file as the collation result back to the user side system 10 of the collation requester from the electronic mail trasnsmitting/receiving device 21 by electronic mail (step S85). If the two do not coincide, on the other hand, the license collation device 23 transmits a warning to the user system 10 of the collation requester from the electronic mail transmitting/receiving device 21 by electronic mail (step S86).

Figure 10:
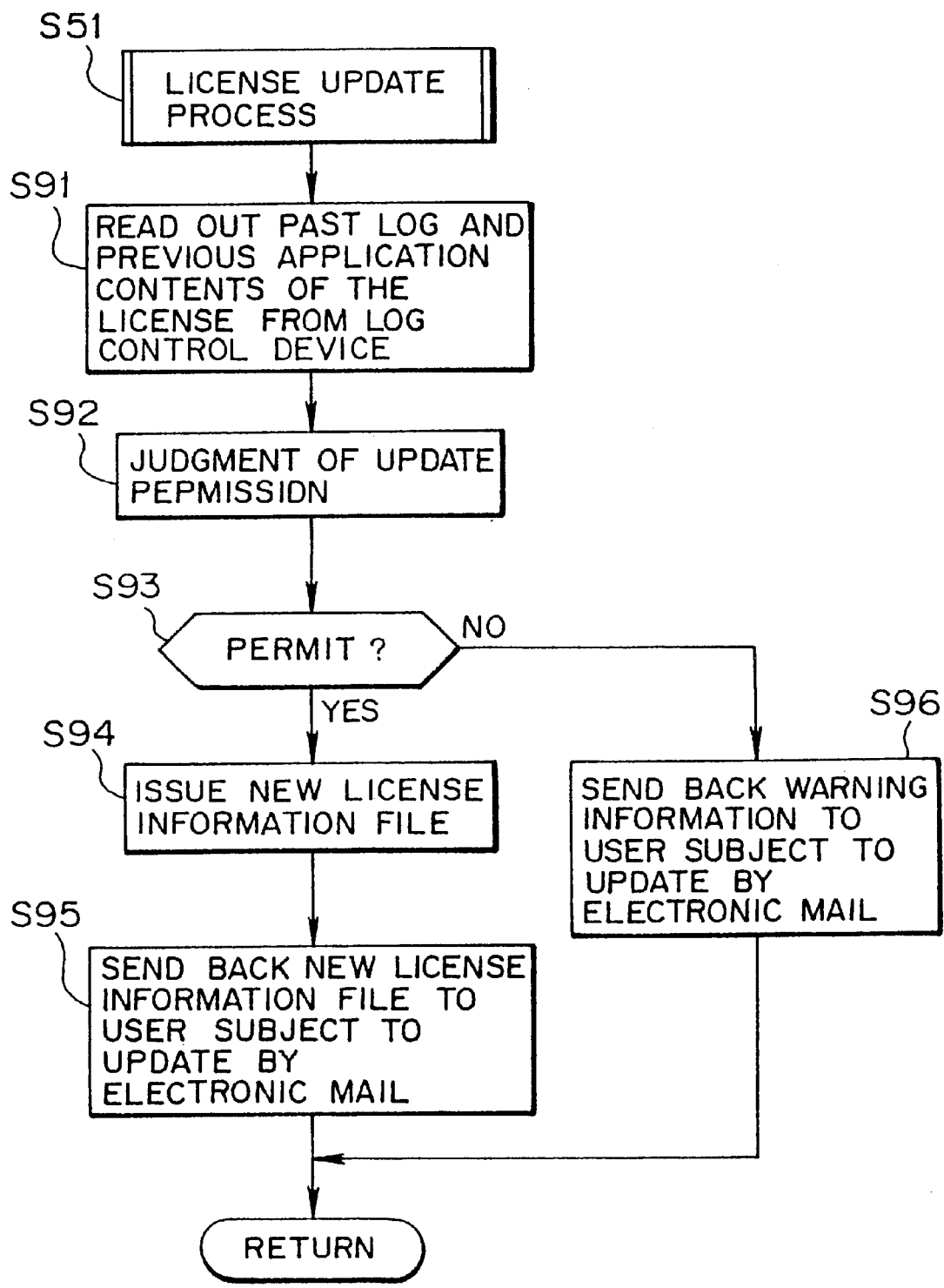
FIG. 10 is a flow chart for explaining a license update process in the license control center of the embodiment in FIG. 2.

The license update process (step S51) executes processes according to the flow chart (step S91~S96) shown in FIG. 10. First, the process reads out the past log and the previous application content relating to the license to be updated from the log control device 25 (step S91), and judges to give permission for the update on the basis of the past log and the previous application content (step S92). In case of giving permission to the update (YES judgment at step S93), the license update device 24 issues a new license information file (step S94), and transmits the new license information file back to the user system 10 to be updated before the expiration date from the electronic mail trasnsmitting/receiving device 21 by electronic mail (step S95). In case of not giving permission to the update (NO judgment at step S93), the license update device 24 transmits a warning to the user side system 10 to be updated from the electronic mail trasnsmitting/receiving device 21 by electronic mail (step S96).

Next, the operation of the software license control system of the embodiment, particularly the information interchange between the user system 10 and the license control center 20 will be described so as to be simply understood with reference to FIG. 11 through FIG. 16.

Figure 11:
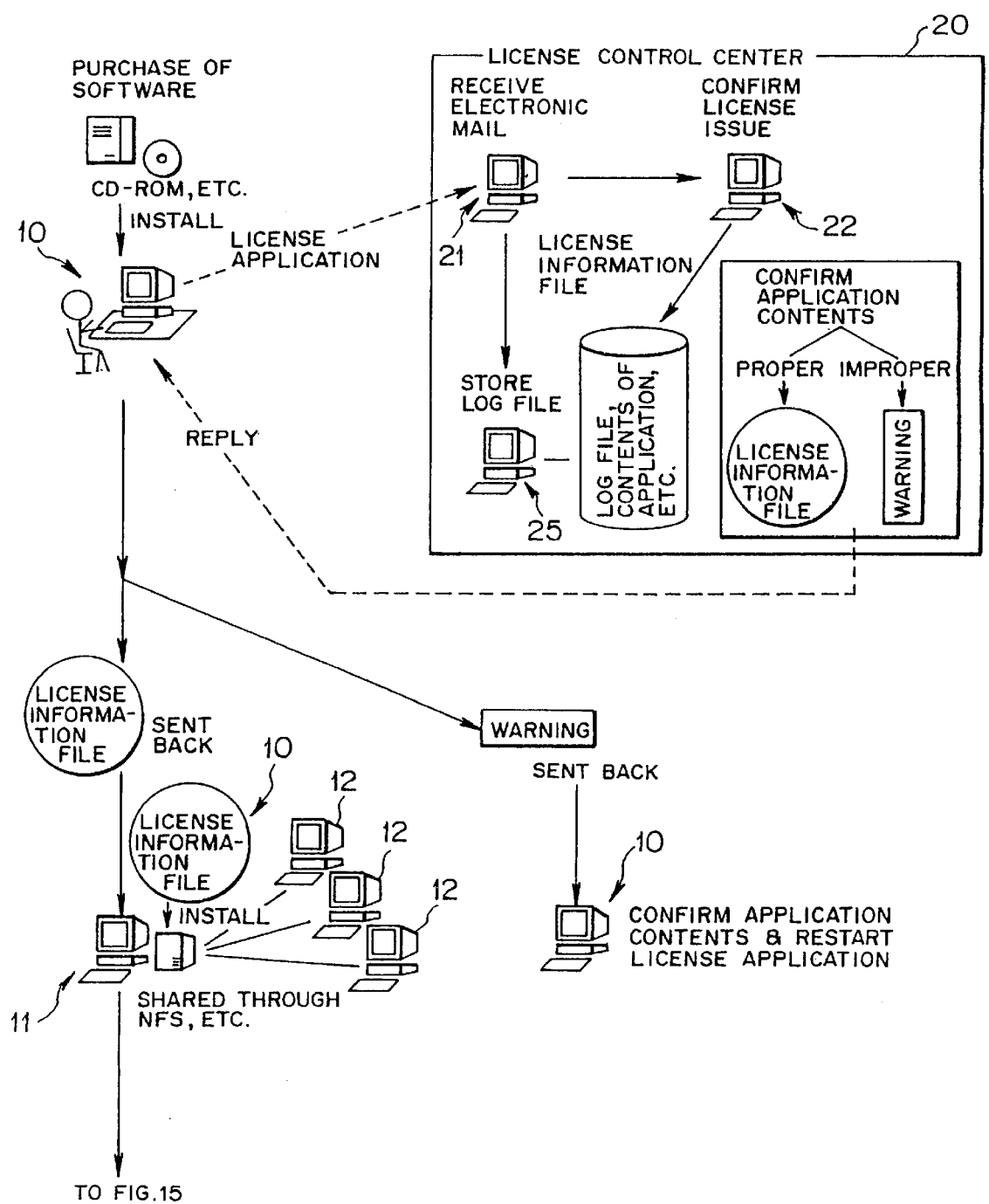
FIG. 11 is a chart for explaining a process until a user starts software in the software license control system of the embodiment in FIG. 2.

FIG. 11 is a chart for explaining a process until user starts a software in the software license control system of the embodiment. As shown in FIG. 11, the user first installs the software (CD-ROM, etc.) and next requests the license to be issued to the license control center 20 by electronic mail.

In the license control center 20, the electronic mail trasnsmitting/receiving device 21 that received electronic mail transfers the content of the electronic mail to the log control device 25 and license issue device 22. The log control device 25 stores the content of the application. The license issue device 22 confirms the content of the application and judges if the content is proper. If it is proper, the license issue device 22 issues a license information file, which is transmitted back to the user of the applicant by electronic mail. If it is improper, on the other hand, the license issue device 22 transmits a warning back to the user of the application.

The user system 10 processes electronic mail transmitted from the license control center 20, when the license information file is sent back, the system sets up the environment whereby the software can be started. The license information file is installed in the file server 11 and the file is shared by a plurality of machines 12. When a warning is sent back, the system displays the warning and the user who sees it confirms the application content and restarts an application for the license.

Figure 12:
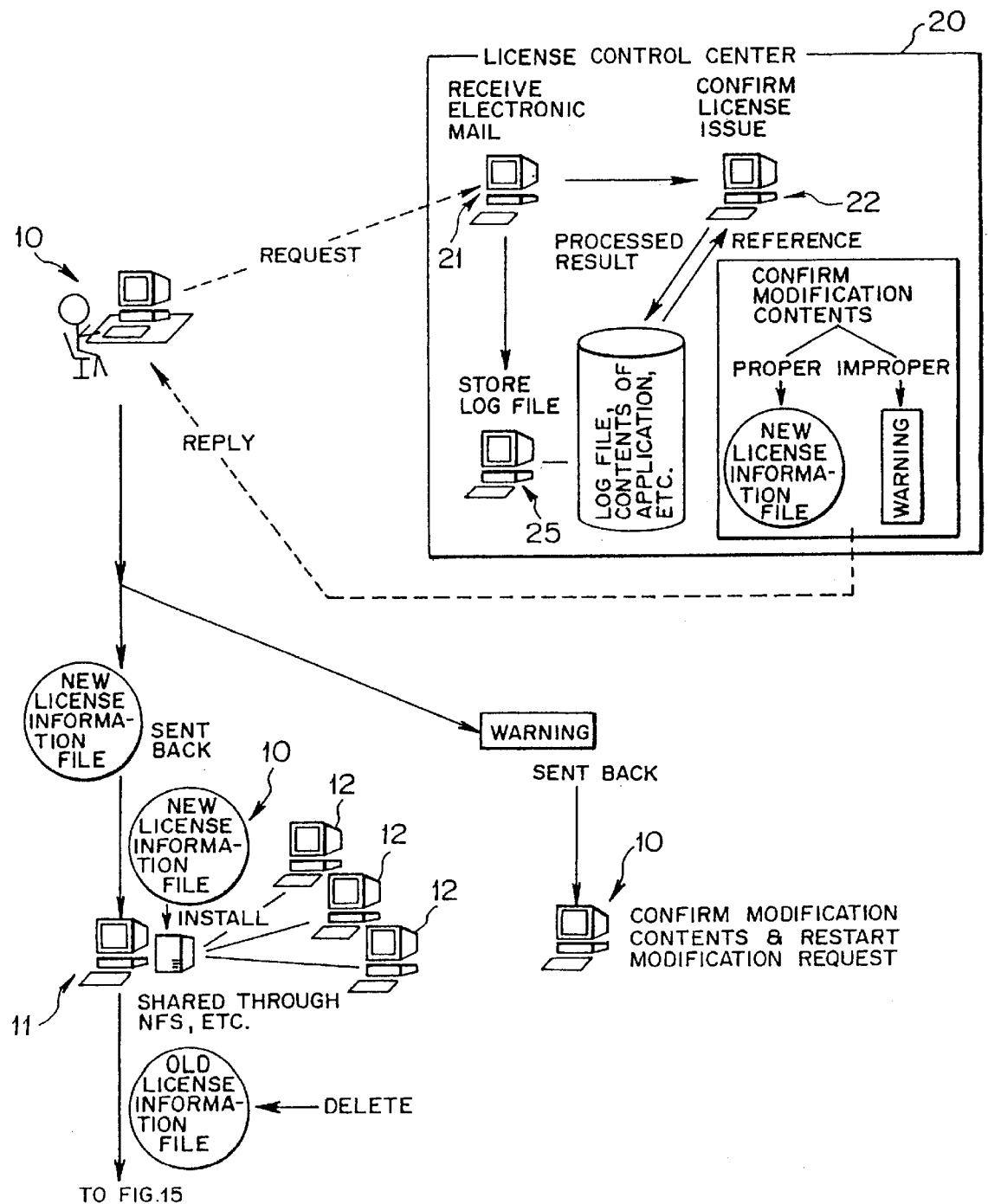
FIG. 12 is a chart for explaining a process in which a user modifies a license in the software license control system of the embodiment in FIG. 2.

FIG. 12 is a chart for explaining a process in which a user modifies a license in the software license control system of the embodiment. As shown in FIG. 12, in the same manner as the case with application to issue a license, the user requests a modification of the license to the license control center 20 by electronic mail.

In the license control center 20, the electronic mail trasnsmitting/receiving device 21 that received the electronic mail transfers the content of the electronic mail to the log control device 25 and license issue device 22. The log control device 25 stores the content of the modification. The license issue device 22 confirms the content of the modification, reads out the log file relating to the license from the log control device 25 for reference, and on the basis of the previous application content and the past log, judges if the content of the modification is proper or not. If it is proper, the license issue device 22 issues a new license information file, which is transmitted back to the user who requested the modification by electronic mail. If it is improper (a fraudulent use of the license or breach of contract is confirmed), on the other hand, the license issue device 22 transmits a warning to the user who requested the modification.

The user system 10 processes electronic mail transmitted back from the license control center 20, and when a new license information file is sent back, the system sets up a new environment so that the software can be started therein. The new license information file is installed in the file server 11 and the file is shared by a plurality of machines 12 and the old license information file is deleted. When a warning is sent back, the user system 10 displays the warning and the user who sees it confirms the modification content and restarts a modification request for the license.

Figure 13:
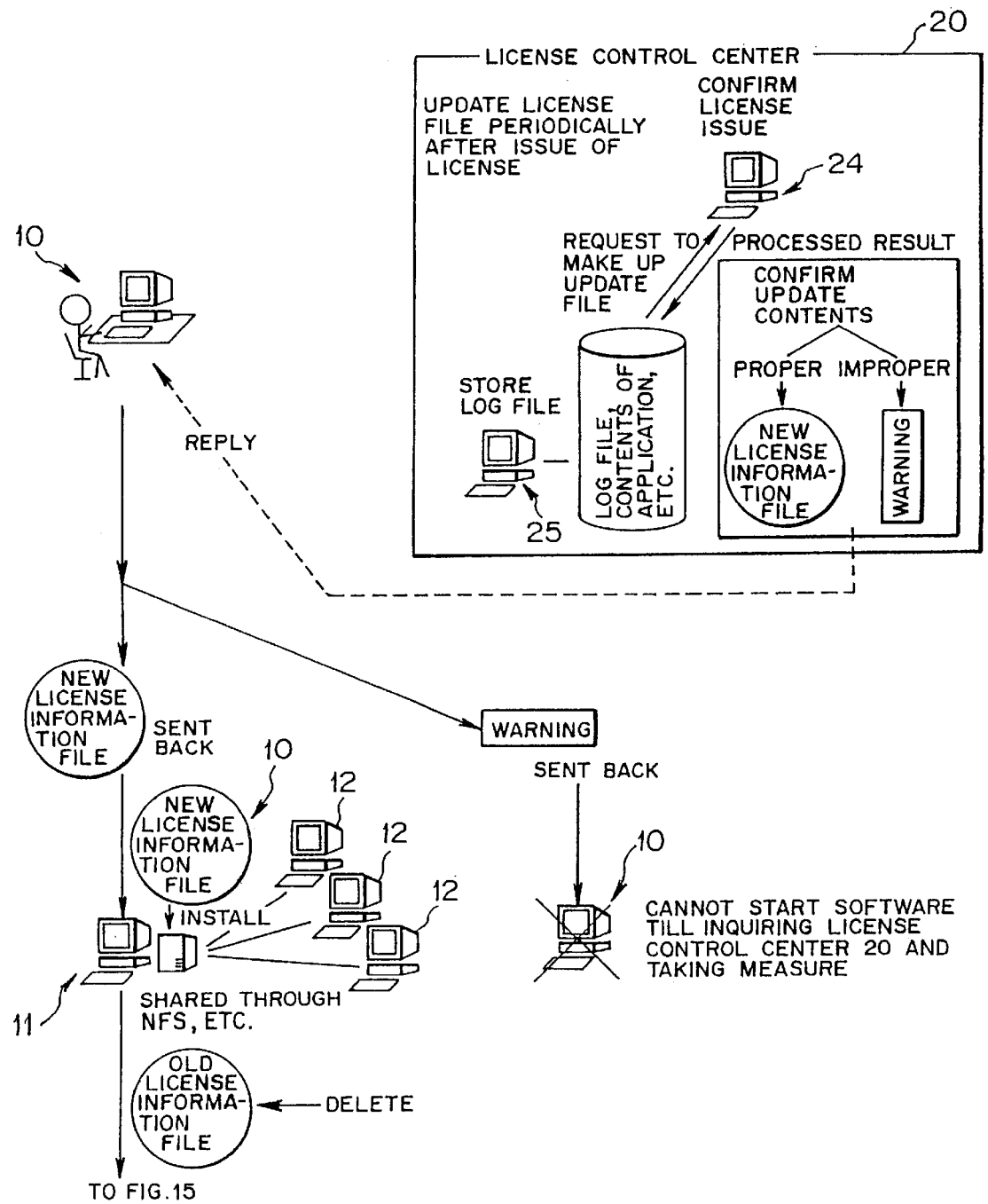
FIG. 13 is a chart for explaining a periodical update process of a license in the software license control system of the embodiment in FIG. 2.

FIG. 13 is a chart for explaining a periodical update process of a license in the software license control system of the embodiment. As shown in FIG. 13, in the license control center 20, the log control device 25 controls the expiration date of the licenses issued. If there isalicenseapproachingtheexpirationdatein the log control device 25, the log control device 25 requests the update file from the license update device 24. Thus, the license update device 24 executes the periodical update process of the license a few days before the expiration date of the license issued by the license control center 20.

In the periodical update process, the license update device 24 reads out the log file relating to the license from the log control device 25 for reference. On the basis of the past log and the previous application content and so forth, the license update device 24 judges whether to give permission for the update. In case of giving permission for the update, the license update device 24 issues a new license information file, which is transmitted back to the user to be updated before the expiration date by electronic mail. In case of not giving permission for the update (a fraudulent use of the license or breach of contract being confirmed), on the other hand, the license update device 24 sends back a warning, instead of a new license information file, to the user to be updated.

Figure 17:
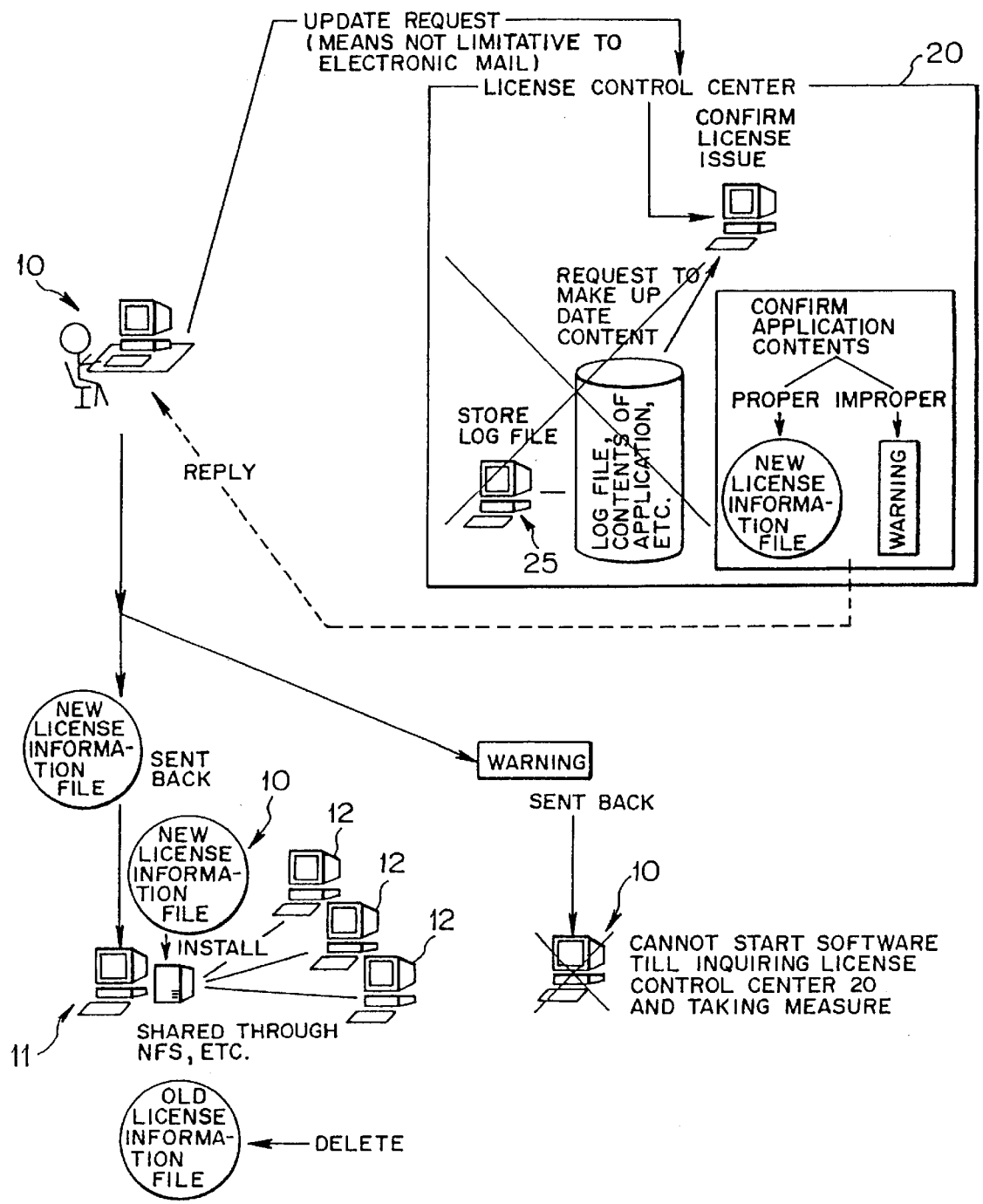
FIG. 17 is a chart for explaining a difference between a license update procedure in the embodiment in FIG. 2 and a conventional license update procedure.

The user system 10 replaces the old license information file with the new license information file when transmitted back, and sets up a new environment so that the software can be started therein. The new license information file is installed in the file server 11 and the file is shared by a plurality of machines 12. When a warning is sent back, the software is not started until the user inquires the license control center 20 and solves the problem. Further, FIG. 17 illustrates an example in which the foregoing periodical update process for the license is compared with the conventional license control system, which will be described later.

Figure 14:
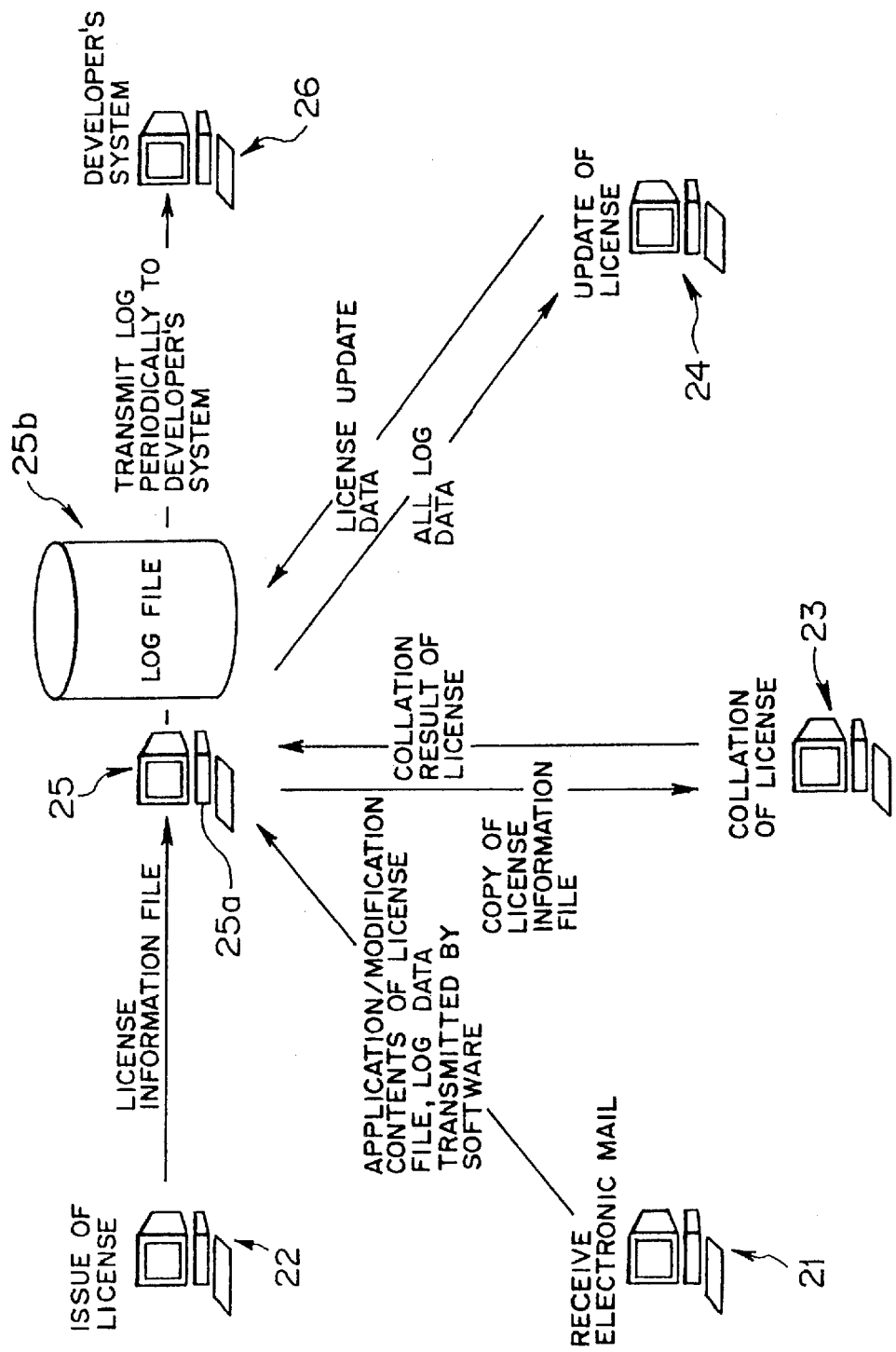
FIG. 14 is a chart for explaining a circumstance of a log control in the license control center of the embodiment in FIG. 2.

FIG. 14 is a chart for explaining a circumstance of the log control in the license control center of the embodiment. As shown in FIG. 14, the log control device 25 records logs from the systems (electronic mail trasnsmitting/receiving device 21, license issue device 22, license collation device 23, license update device 24), stores the logs for a specific term, and provides the log when the system requests.

Figure 18:
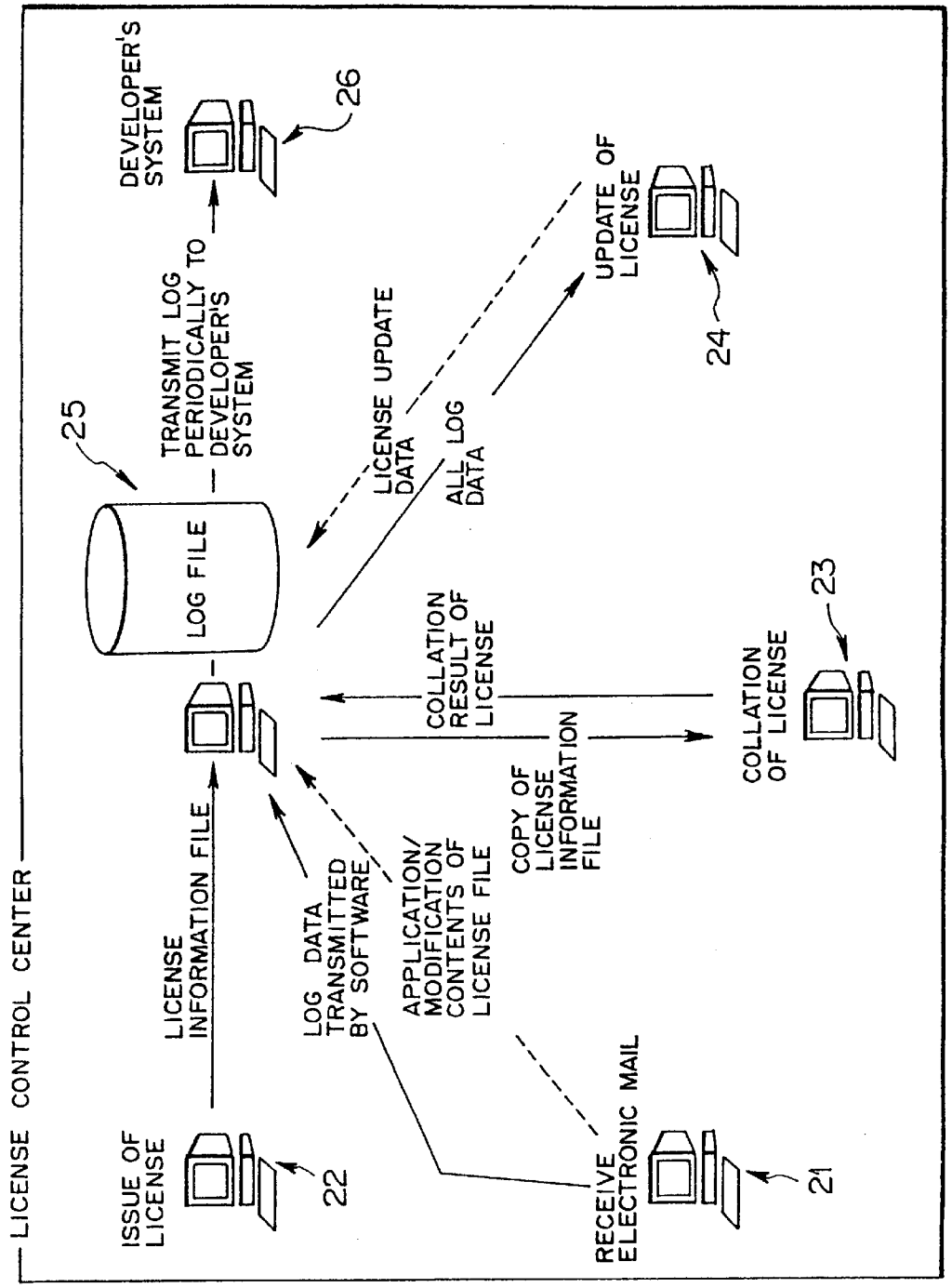
FIG. 18 is a chart for explaining difference between the log control in the embodiment in FIG. 2 and a conventional log control.

(1) electronic mail transmitting/receiving device 21 [record] contents of application and modification for license transmitted by users [record] log files transmitted by software on starting [supply] no information (2) license issue device 22 [record] license information files issued when licenses are applied [supply] no information (3) license collation device 23 [record] collation results of licenses [supply] copies of license information files issued when licenses are applied (4) license update device 24 [record] update contents of licenses (license information files newly issued) [supply] all the log data Further, the log control device 25 transfers the log data periodically to the development and support division (developer's system 26), and the log data are reflected on the development and support of the software. FIG. 18 illustrates an example in which the foregoing circumstance of the log control is compared with the conventional license control system, which will be described later.

Figure 15:
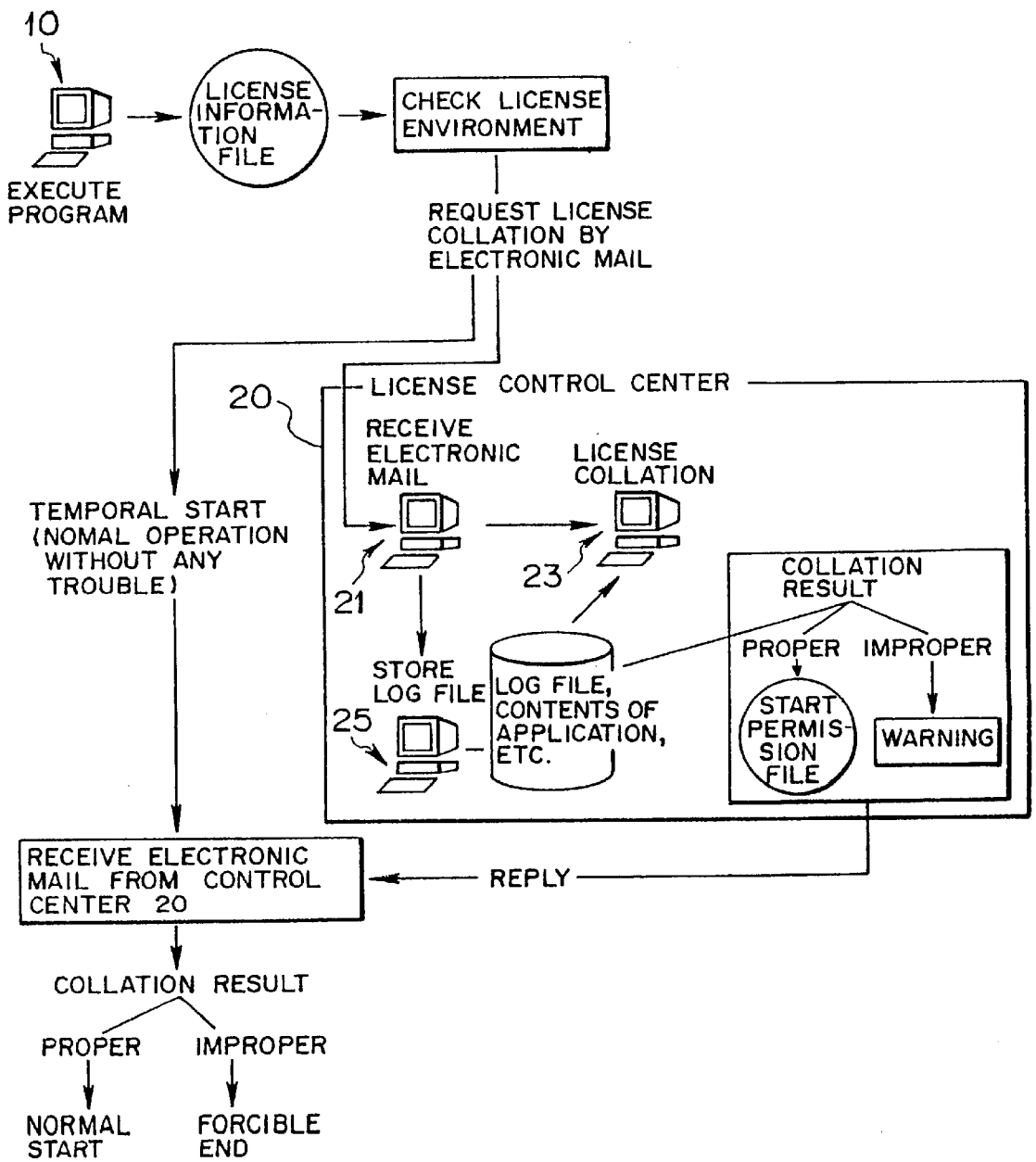
FIG. 15 is a chart for explaining a process for starting software in the software license control system of the embodiment in FIG. 2.

FIG. 15 is a chart for explaining a process for starting software in the software license control system of the embodiment. As shown in FIG. 15, when software is to be started, first the license environment check program P1 (license confirmation program) is executed to refer to the license information file relating to the software. At this moment, if the license environment check program P1 cannot access the license information file, the program P1 is brought to an abnormal end.

The license environment check program P1 confirms a license environment using a license information file. If the license environment set in the license information file is different from an actual execution environment, the program P1 is brought to an abnormal end.

Thus, the license environment is confirmed, and if there is not any abnormality, the license collation request program P2 is started to request the final confirmation (collation) of the license to the license control center 20 by electronic mail. At this moment, if the program P2 cannot send electronic mail, the program P2 comes to an abnormal end.

If the program P2 can send electronic mail for requesting a license collation, the main program P0 of the software is temporarily permitted to be started (temporary start state), the standby program P3 is started, and the program P2 awaits the reply mail including the collation result. The main program P0 temporarily started operates in the completely the same manner as when it is started normally.

The license collation device 23 of the license control center 20 reads out a copy of the license information file issued when the license was applied from the log control device 25, and compares the copy with the license information file transmitted from the user by electronic mail. Based on the comparison result, the license collation device 23 judges the propriety or of the license, and the collation result is sent back to the user by electronic mail.

Figure 19:
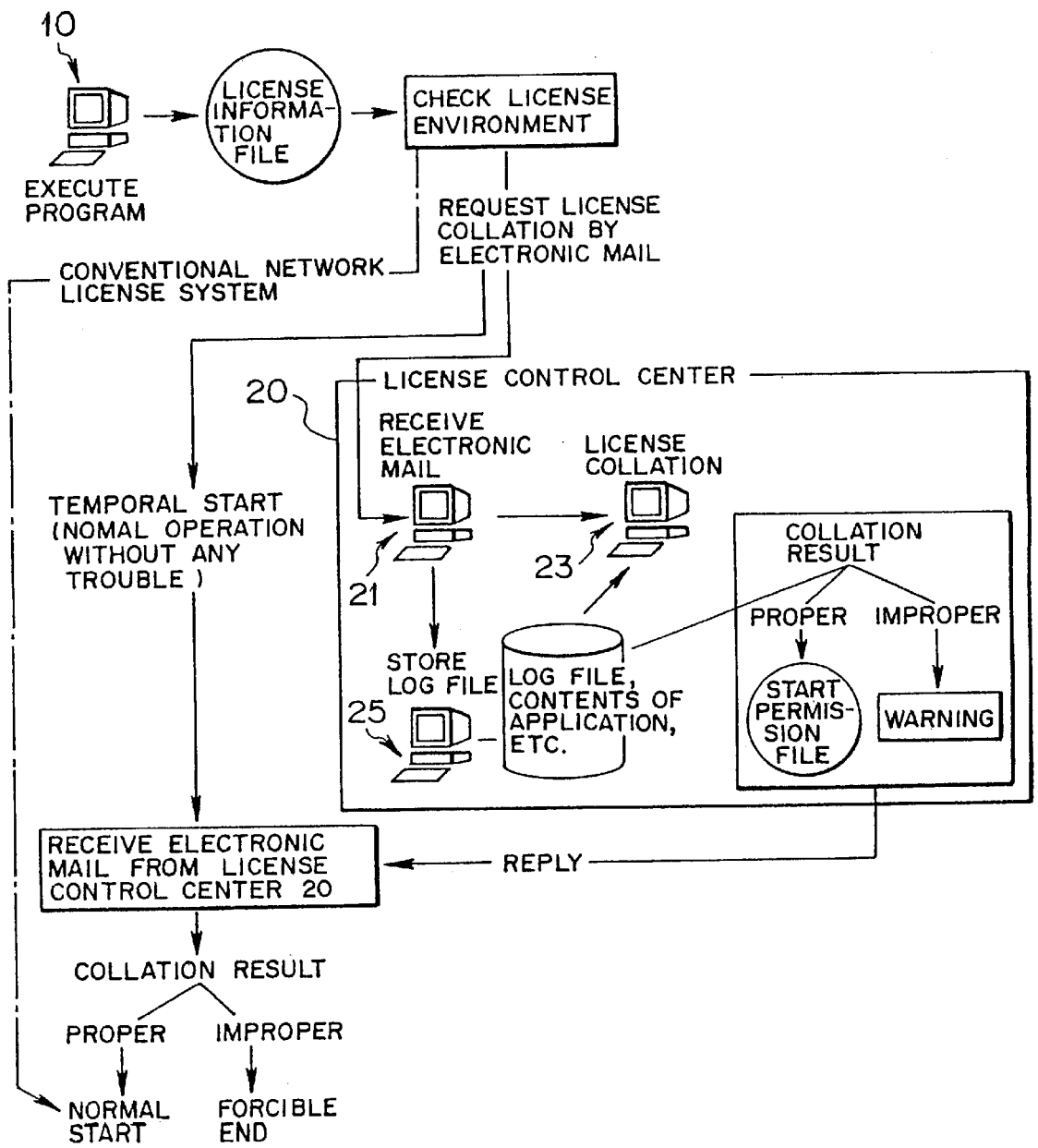
FIG. 19 is a chart for explaining a difference between a license collation procedure in the embodiment in FIG. 2 and a conventional license collation procedure.

In the user system 10, if electronic mail sent back from the license control center 20 contains a warning, the software temporarily started is forcibly ended. If electronic mail sent back from the license control center 20 contains a file to permit starting, the software temporarily started is regarded as being normally started and the standby program P3 is brought to a normal end. FIG. 19 illustrates an example in which the foregoing starting process of the software is compared with the conventional license control system, whichwill be described later.

Figure 16:
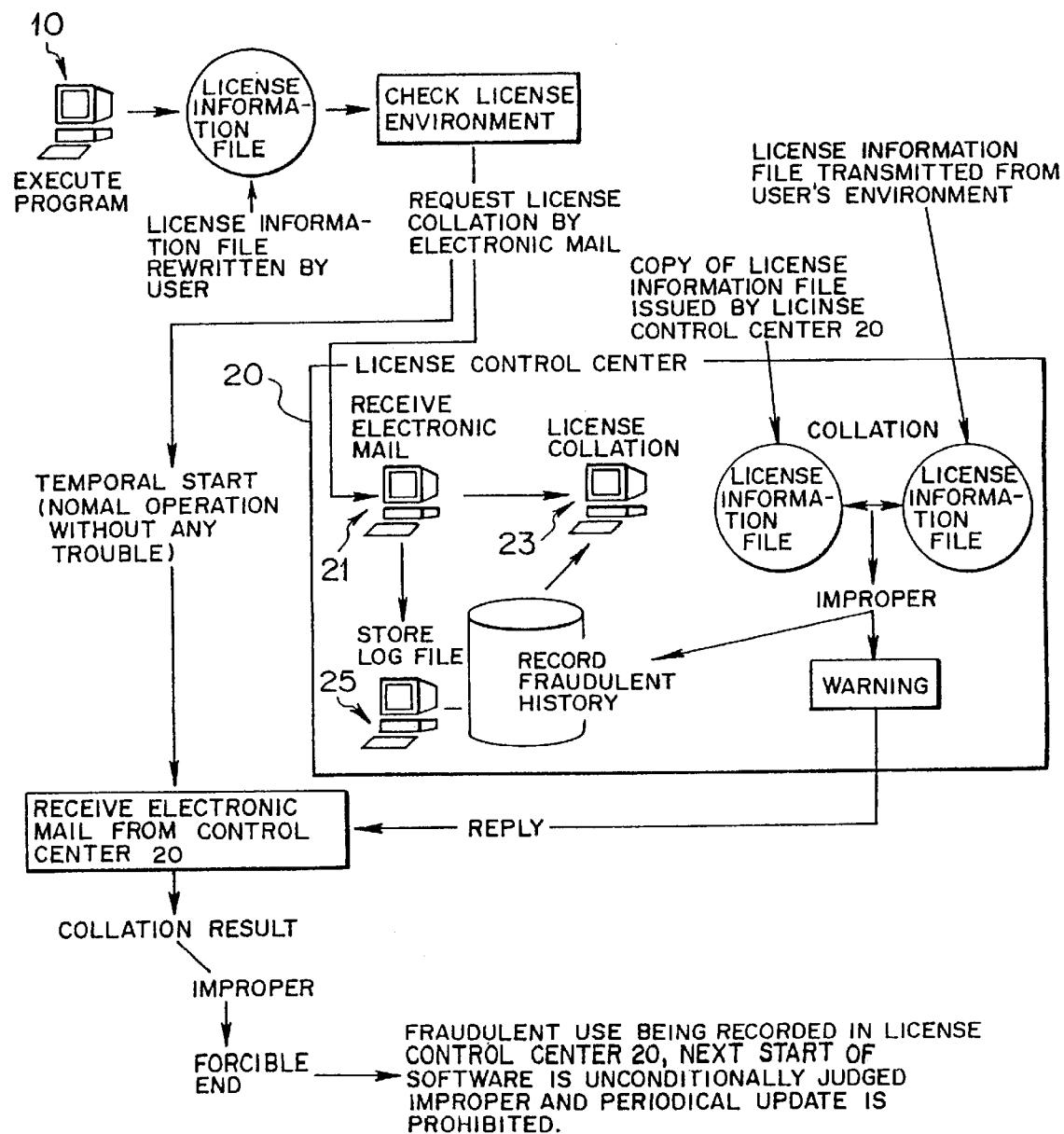
FIG. 16 is a chart for explaining a process for preventing a fraudulent start of software in the software license control system of the embodiment.

FIG. 16 is a chart for explaining a process for preventing fraudulent start of a software in the software license control system of the embodiment.

Generally, a license information file is enciphered and a user cannot modify the information of the file. However, if a user could, by some rare accident, decipher and modify the license information file, or if a user fraudulently creates a license information file without officially applying for a license, the license environment check program P1 can not possibly check the fraudulence of a license.

At that moment, to start the software will not produce a warning depending on the condition of the license environment check. And then, the license collation request as well as the license information file and log file is transmitted to the license control center 20 by electronic mail.

The license collation device 23 of the license control center 20 reads out a copy of the license information file issued when the license was applied from the log control device 25, and compares the copy with the license information file transmitted from a user by electronic mail; and thereby, the license collation device 23 confirms fraudulence of the license and records the information (fraud history) in the log control device 25 and sends back a warning to the user by electronic mail.

In the user system 10, when receiving the warning from the license control center 20 by electronic mail, the software temporally started by a fraudulent license is forcibly ended after a warning display.

If the software is at that moment ended normally before the warning arrives from the license control center 20, the fraud history is recorded in the license control center 20 (log control device 25). Therefore, when the same software is started next, the license is judged improper without any conditions and the collation result from the license control center 20 becomes improper to forcibly end the software. Further, the software will be excluded from the periodical update.

If the running time of the software is short and the warning from the license control center 20 is not processed each time and thereby the software cannot forcibly be ended, the license control center 20 will not update the license information file, thereby deleting a fraudulent user.

Next, the differences between the periodical update process of a license, circumstance of the log control, and starting process of a software in the foregoing embodiment and those of the conventional license control system are described with reference to FIGS. 17, 18, and 19.

FIG. 17 is a chart for explaining a difference between a license update procedure in the embodiment and a conventional license update procedure, which is correspondent to FIG. 13. As shown in FIG. 17, in this embodiment, the periodical update of a license is automatically executed by the function of the log control device 25 and license update device 24 in the license control center 20. In the conventional license control system, the update process of a license is not executed before a license control center receives a request to update the license from a user.

As shown in FIG. 17, the conventional license control system does not record past operations as the log data, and the conventional system judges approval or disapproval on the issue of a new license information file on the basis of only the application contents when updated, and therefore, the update of a license lacks reliability. However, this embodiment judges an update approval using the past log data stored in the log control device 25, thus performing a strict license control and enhancing reliability of a license.

FIG. 18 is a chart for explaining a difference between the log control in the embodiment and a conventional log control, which is correspondent to FIG. 14. In FIG. 18, the solid line arrows show data flows added by the invention, and the dotted line arrows show common data flows as to the conventional technique and the invention.

As shown in FIG. 18, the conventional license control system can collect logs when licenses are applied and modified, however, the license collation is done only in a user environment, and the system cannot control logs when software is started.

Further, when updating a license, since the content of a log data is insufficient, the conventional system cannot employ the log data as the material to judge approval or disapproval in updating the license.

Furthermore, since the conventional system cannot collect a log data of the operational environment every time when software starts, the system cannot reflect the changing operational environments of the software on a user side on the software development.

All these problems that cannot be solved by the conventional license control system can be solved by the present invention.

FIG. 19 is a chart for explaining a difference between a license collation procedure in the embodiment and a conventional license collation procedure. In FIG. 19, the solid line arrows show data flows added by the invention, the dotted line arrows show common data flows as to the conventional technique and the invention, and the chain line arrow shows a conventional data flow.

As shown in FIG. 19, the conventional license control system only refers to a license information file in a user environment and collates a license condition of a license information file with an operational environment in which software is started, before the system sets the software into the normal start state, and therefore, a strict license control cannot be accomplished. However, the system according to the invention not only checks a license environment inside a user environment, but also requests a license collation to the license control center 20, and therefore, a strict license control can be accomplished, thus enhancing reliability of a license.

Thus, according to the embodiment of the invention, the user system 10 and the license control center 20 interchange information on a license for software by electronic mail; and thereby, reduce most of the processes executed by a user in the conventional system, making the license control of software efficient, enhancing reliability of a license, and simplifying a license control operation by a user.

Since the license control operation only needs to run the program to control a license on starting software, the control operation does not impose extra load on the user system 10, and since the control operation can minimize settings to the user system 10, the system greatly contributes to simplifying the license control that a user has to do.

Further, the software requests a license collation to the license control center 20 by electric mail, which significantly enhances reliability of a license.

Furthermore, the log control device 25 records and stores therein the results of issues, modifications, and updates of licenses processed through electronic mail, and the contents stored in the log control device 25 are used for judging propriety to issue, modify, and update a license; thereby, enabling a strict license control and greatly contributing to enhancing reliability of a license.

Still, since the log control device 25 stores therein log data of software and various processed results relating to the licenses and the developer's system 26 of the software can refer to the contents stored in the log control device 25, the system can reflect the contents on the development or support of software and greatly contribute to improving efficiency in developing software, enhancing quality and reliability of software, and improving efficiency in examining countermeasure against faults by a software.

In the foregoing embodiment, the electronic mail trasnsmitting/receiving device 21 transmits electronic mail from the license control center 20 to the user system 10; however, the license issue device 22, license collation device 23, and license update device 24 may be designed to directly transmit electronic mail to the user system 10 and the electronic mail transmitting/receiving device 21 may be used exclusively for receiving electronic mail.

Further, in the foregoing embodiment, the electronic mail trasnsmitting/receiving device 21, license issue device 22, license collation device 23, license update device 24, log control device 25 are each individually provided. However, more than two of these functions may be incorporated into one machine.

Still further, in the foregoing embodiment, although the software execution equipment is assumed to adopt the NFS, the invention is not confined to this.

The invention being thus described, it will be obvious that the same may be varied in many ways. Such variations are not to be regarded as a departure from the invention, and all such modifications as would be obvious to one skilled in the art are intended to be included within the scope of the following claims.

What is claimed is:

1. A software license management system, comprising:

software execution equipment for executing software installed therein, including
  means for requesting issuance of a license for a software when the software is installed in said software execution equipment, and
  means for requesting confirmation of the license for the software when the software is used; and software license management equipment for managing a license for the software by exchanging information relating to the license for the software with said software execution equipment via electronic mail, including
  an electronic mail receiving device for receiving a message from said software execution equipment via electronic mail,
  an electronic mail sending device for sending a message to said software execution equipment via electronic mail,
  a license issue device for, when said electronic mail receiving device has received a message that contains a request to issue a license for a software, issuing a license for the software based on the license issuing request and also transmitting a message that contains information about the issued license using said electronic mail sending device to said software execution equipment via electronic mail, a log management device for storing the information about the license issued by said license issue device as license information, and a license confirmation device for, when said electronic mail receiving device has received a message containing a request to confirm the license for the software, confirming the license based on both the license confirming request and the license information stored in said log management device and, further transmitting a message that contains a confirmation result of the license through said electronic mail sending device to said software execution equipment via electronic mail.

2. A software license management system as claimed in claim 1, wherein when said electronic mail receiving device has received a message that contains a request to modify a license, said license issue device is operable to modify the license based on of the license modifying request and also to transmit a message that contains information about the license as modified, using said electronic mail sending device, to said software execution equipment via electronic mail.

3. A software license management system as claimed in claim 2, wherein said software license management equipment further includes a license updating device to automatically perform a periodical update of the license before an expiration date of the license issued by said license issue device and to transmit a message that contains update information using said electronic mail sending device to said software execution equipment via electronic mail, and wherein said log management device is operable to record items of information, including at least one of: information about a request to issue or modify a license received by said electronic mail receiving device, information about the license issued by said license issue device, information about a license confirmation result by said license confirmation device, and information about update by said license update device; and to store the items of information as log data.

4. A software license management system as claimed in claim 3, wherein when said license issue device modifies a license, said license issue device is operable to refer to the log data stored in said log management device and to judge whether modification is proper or improper based on the log data.

5. A software license management system as claimed in claim 4, wherein when said license issue device has judged that the modification is improper, said license issue device is operable to transmit warning information using said electronic mail sending device to said software execution equipment via electronic mail.

6. A software license management system as claimed in claim 3, wherein when said license confirmation device confirms a license, said license confirmation device is operable to refer to the log data stored in said log management device and to confirm the license based on the log data.

7. A software license management system as claimed in claim 6, wherein when a confirmation result is improper, said license confirmation device is operable to transmit warning information using said electronic mail sending device to said software execution equipment via electronic mail.

8. A software license management system as claimed in claim 7, wherein the software executed in said software execution equipment has:

a check function of checking a license environment in said software execution equipment based on the license information file of the software and, when having judged that the license environment is proper, turning into a temporary start state, and a standby function of waiting for a confirmation result from said software license management equipment and, if the confirmation result is proper, turning from the temporary start state into a normal start state and, on the other hand, if the confirmation result is improper, terminating.

9. A software license management system as claimed in claim 6, wherein the software executed in said software execution equipment has:

a check function of checking a license environment in said software execution equipment based on the license information file of the software and, when having judged that the license environment is proper, turning into a temporary start state, and a standby function of waiting for a confirmation result from said software license management equipment and, if the confirmation result is proper, turning from the temporary start state into a normal start state and, on the other hand, if the confirmation result is improper, terminating.

10. A software license management system as claimed in claim 3, wherein when said license update device executes a periodical update of a license, said license update device is operable to refer to the log data stored in said log management device and to decide whether to permit the update of the license based on the log data.

11. A software license management system as claimed in claim 10, wherein when said license update device has decided to reject the update, said license update device is operable to abort the periodical update of the license and to transmit warning information using said electronic mail sending device to said software execution equipment via electronic mail.

12. A software license management system as claimed in claim 3, wherein the software executed in said software execution equipment has a log data transmission function of transmitting, on starting the software, log data of the software to said software license management equipment via electronic mail, and wherein in said software license management equipment, when said electronic mail receiving device has received a message containing the log data of the software, said log management device is operable to record and store the log data of the software.

13. A software license management system as claimed in claim 12, wherein said log management device is operable to transmit the data stored in said log management device to a developer or a seller of the software periodically or occasionally.

14. A software license management system as claimed in claim 3, wherein said log management device is operable to transmit the data stored in said log management device to a developer or a seller of the software periodically or occasionally.

15. A software license management system as claimed in claim 1, wherein the software executed in said software execution equipment has a license confirmation function to transmit, on starting the software, a license confirmation request for the software, including a license information file of the software, to said software license management equipment via electronic mail, and wherein when said electronic mail receiving device has received a message containing the license confirmation request, said license confirmation device is operable to confirm a license based on the license information file included in the license confirmation request, and to transmit a message containing a confirmation result by said license confirmation device via said electronic mail sending device to said software execution equipment via electronic mail.

16. A software license management system as claimed in claim 15, wherein the software executed in said software execution equipment has:

a check function of checking a license environment in said software execution equipment based on the license information file of the software and, when having judged that the license environment is proper, turning into a temporary start state, and a standby function of waiting for a confirmation result from said software license management equipment and, if the confirmation result is proper, turning from the temporary start state into a normal start state and, on the other hand, if the confirmation result is improper, terminating.

17. A software license management system as claimed in claim 1, wherein: said software license management equipment further includes a license update device for automatically performing a periodical update of the license before an expiration date of the license issued by said license issue device and also transmitting a message containing update information using said electronic mail sending device to said software execution equipment via electronic mail.

18. Software license management equipment for managing a license for software executed in software execution equipment by exchanging information about the license for the software with said software execution equipment via electronic mail, said software license management equipment comprising:

an electronic mail receiving device for receiving a message from said software execution equipment via electronic mail;

an electronic mail sending device for sending a message to said software execution equipment via electronic mail;

a license issue device to issue a license for software based on a request to issue a license when said electronic mail receiving device receives a message containing the request to issue the license for the software, and to transmit to said software execution equipment using said electronic mail sending device, electronic mail containing information about the issued license;

a log management device for storing the information about the license issued by said license issue device as license information;

a license confirmation device to confirm, when said electronic mail receiving device has received a message containing a request to confirm the license for the software, the license based on both of the request to confirm the license and the license information stored in said log management device and to transmit to said software execution equipment using said electronic mail sending device, electronic mail containing a confirmation result.

19. Software license management equipment as claimed in claim 18, wherein when said electronic mail receiving device has received a message that contains a request to modify a license, said license issue device is operable to modify the license and to transmit electronic mail containing information about the license as modified, using said electronic mail sending device, to said software execution equipment.

20. Software license management equipment as claimed in claim 19, further comprising a license updating device for automatically performing a periodical update of the license before an expiration date of the license issued by said license issue device, and transmitting electronic mail containing update information using said electronic mail transmitting device to said software execution equipment, and wherein said log management device is operable to record items of information, including at least one of: information about a request to issue or modify a license received by said electronic mail receiving device, information about the license issued by said license issue device, information about a confirmation result by said license confirmation device, and information about update by said license update device, and storing said items of information as log data.

21. Software license management equipment as claimed in claim 20, wherein when modifying a license, said license issue device is operable to refer to the log data stored in said log management device and to judge whether modification is proper based on the log data.

22. Software license management equipment as claimed in claim 21, wherein when said license issue device has judged that the modification is improper, said license issue device is operable to transmit warning information using said electronic mail sending device to said software execution equipment via electronic mail.

23. Software license management equipment as claimed in claim 20, wherein when said license confirmation device confirms a license, said license confirmation device is operable to refer to the log data stored in said log management device and to confirm the license based on the log data.

24. Software license management equipment as claimed in claim 23, wherein when a confirmation result is improper, said license confirmation device is operable to transmit warning information using said electronic mail sending device to said software execution equipment via electronic mail.

25. Software license management equipment as claimed in claim 20, wherein, when said license update device performs a periodical update of a license, said license update device is operable to refer to the log data stored in said log management device and to decide whether to permit the update based on the log data.

26. Software license management equipment as claimed in claim 25, wherein, when said license update device has decided to reject the update, said license update device is operable to abort the periodical update of the license and to transmit warning information using said electronic mail sending device to said software execution equipment via electronic mail.

27. Software license management equipment as claimed in claim 20, wherein when said electronic mail receiving device has received a message containing log data of the software, said log management device is operable to record and store the log data of the software.

28. Software license management equipment as claimed in claim 27, wherein said log management device is operable to transmit the data stored in said log management device to a developer or a seller of the software periodically or occasionally.

29. Software license management equipment as claimed in claim 20, wherein said log management device is operable to transmit the data stored in said log management device to a developer or a seller of the software periodically or occasionally.

30. Software license management equipment as claimed in claim 18, wherein, when said electronic mail receiving device has received a message containing a confirmation request of the license, said license confirmation device is operable to confirm the license based a license information file included in the confirmation request of the license, and to transmit electronic mail containing a confirmation result to said software execution equipment.

31. Software license management equipment as claimed in claim 18, further comprising a license update device for automatically performing a periodical update of the license before an expiration date of the license issued by said license issue device and transmitting electronic mail containing update information using said electronic mail sending device to said software execution equipment.

32. A method for managing a license for software in a system including software execution equipment for executing software installed therein and a license management equipment for managing the license for the software, said method comprising:

issuing a license for software when the software is installed in said software execution equipment, including transmitting, from the software execution equipment to the license management equipment, a message containing a license issuing request for a license to use the software, issuing, by the license management equipment, a license to use the software based on the license issuing request, transmitting, from the license management equipment to the software execution equipment, a message containing license information about the license as issued, and storing the license information in the license management equipment; and confirming the license to use the software when the software is executed in the software execution equipment, including transmitting, from the software execution equipment to the license management equipment, a message containing a license confirming request to confirm the license to use the software, confirming, in the license management equipment, the license based on both the license confirming request and the license information stored in the license management equipment, transmitting, from the license management equipment to the software execution equipment, a message containing a confirmation result of said confirming, and controlling, in the software execution equipment, execution of the software based on the confirmation result.

33. Software license management equipment for managing a license for software by exchanging information related to the license for the software with software execution equipment for executing the software, said software license management equipment comprising:

a message receiving device to receive a message from the software execution equipment;

a message sending device for sending a message to the software execution equipment;

a license issue device to issue, when said message receiving device has received a message containing a request to issue a license for the software, a license for the software based on the request to issue a license and to transmit to said software execution equipment using said message sending device, a message containing license information about the license as issued, a storage device to store the license information, a license confirmation device to confirm, when said message receiving device has received a message containing a request to confirm the license for the software, the license based on both the request to confirm the license and the license information stored in said storage device and to transmit to said software execution equipment using said message sending device, a message containing a confirmation result of the license.

* * * * *